United States Patent
Yone

(10) Patent No.: US 7,069,801 B2
(45) Date of Patent: Jul. 4, 2006

(54) APPARATUS FOR GENERATING TACTILE FORCE FOR A VEHICLE

(75) Inventor: Shinichi Yone, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 135 days.

(21) Appl. No.: 10/865,196

(22) Filed: Jun. 9, 2004

(65) Prior Publication Data

US 2004/0254048 A1 Dec. 16, 2004

(30) Foreign Application Priority Data

Jun. 10, 2003 (JP) .............................. 2003-165577

(51) Int. Cl.
*F16H 59/00* (2006.01)
*G05G 1/14* (2006.01)

(52) U.S. Cl. .......................................... 74/335; 74/513

(58) Field of Classification Search .................. 74/335, 74/513; 477/115; 123/399
See application file for complete search history.

(56) References Cited

U.S. PATENT DOCUMENTS

| | | | |
|---|---|---|---|
| 6,689,016 B1 * | 2/2004 | Apel | 477/115 |
| 6,920,385 B1 * | 7/2005 | Egami | 701/70 |
| 6,981,486 B1 * | 1/2006 | Yone et al. | 123/399 |
| 2003/0190996 A1 * | 10/2003 | Yone | 477/120 |

FOREIGN PATENT DOCUMENTS

| | | |
|---|---|---|
| JP | 2001-105926 | 4/2001 |
| JP | 2003-260948 | 9/2003 |
| JP | 2003-291682 | 10/2003 |

* cited by examiner

*Primary Examiner*—Dirk Wright
(74) *Attorney, Agent, or Firm*—Hamre, Schumann, Mueller & Larson, P.C.

(57) ABSTRACT

An apparatus for generating tactile force for a vehicle is provided, which includes a motor for generating the tactile force, a spring for generating the tactile force, an electromagnetic brake for cooperatively generating the tactile force with at least one of the motor and the spring, an accelerator pedal and a shift lever. The apparatus generates the tactile force for at least one of the accelerator pedal and the shift lever with a drive-by-wire method.

13 Claims, 14 Drawing Sheets

PEDAL POSITION KEEP

EXCEEDING θ1

CANCELLATION OF AUTO CRUISE

EXCEEDING θ1

GREAT TACTILE FORCE
(GREAT DEPRESSING FORCE)

SMALL TACTILE FORCE
(SMALL DEPRESSING FORCE)

CANCELLATION OF AUTO CRUISE

FIG. 13A
PRIOR ART
FIG. 13B
PRIOR ART
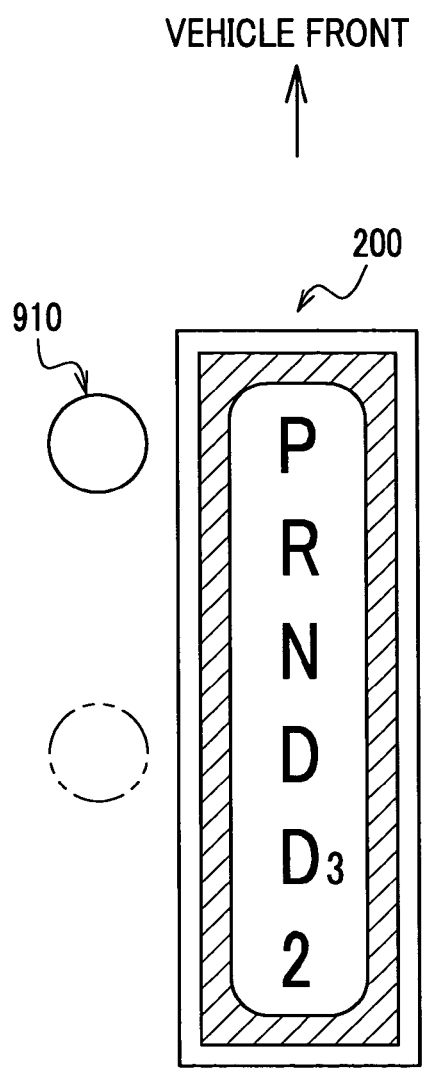
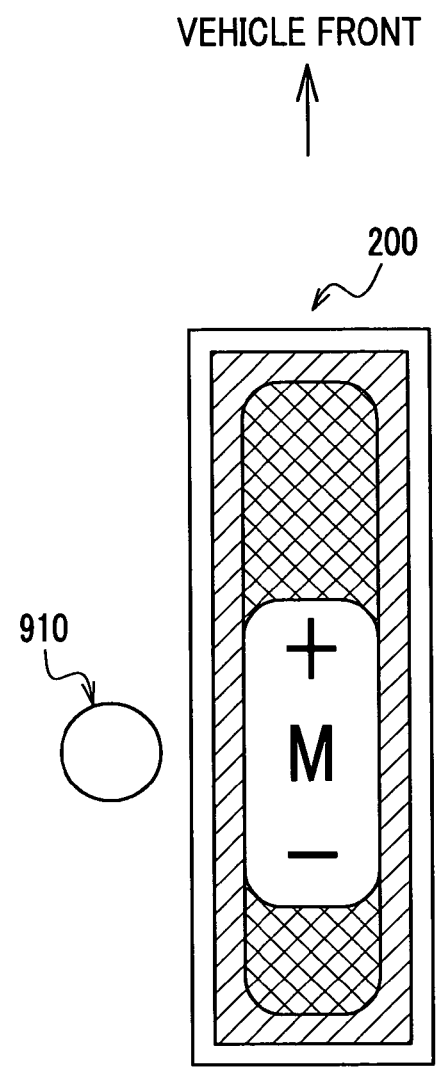

APPARATUS FOR GENERATING TACTILE FORCE FOR A VEHICLE

BACKGROUND OF THE INVENTION

The present invention pertains to an apparatus for generating a tactile force for a vehicle, and in particular to an apparatus which generates not only a tactile force for depression and restoration of an accelerator pedal but also a tactile force and a detent force for a shift lever, introducing a combination of a spring, a motor and an electromagnetic brake.

When a driver of a vehicle manipulates its shift lever or pedal, with which he gives directions to it, he feels a reaction force in his hand or foot, which is generated according to an amount of manipulation of the lever or the pedal. In this connection, a haptic device is known, in which the shift lever and the accelerator pedal are used not only as input apparatus but also as output apparatus.

The applicant of the present invention filed Japanese Patent Application 2002-101860 (Japanese Published Patent Application 2003-291682) titled "VEHICULAR ACCELERATOR PEDAL DEVICE". FIG. 10 of this application is a block diagram showing a conventional vehicular accelerator pedal device and FIG. 11 is a graph depicting operational characteristics of the device. As shown in FIG. 11, from the bottom to top of a vertical axis are shown a signal FS2 of pedal depression, a throttle angle θTH2, transmission information TJ2, a tactile force RT2 exerted by a tension coil spring, a tactile force RM2 exerted by a motor and a pedal tactile force RP2 which is a summation of RT2 and RM2. On the other hand, a horizontal axis represents an amount PS2 of pedal depression.

As shown in FIGS. 10 and 11, when a driver depresses an accelerator pedal 150, the signal FS2 starts increasing when once the amount PS2 reaches S10. The throttle angle θTH2 starts increasing, accordingly.

The tactile force RT2 steeply increases until the amount PS2 reaches S10. After the amount PS2 reaches S10, the tactile force RT2 starts increasing in proportion to the amount PS2. Thereafter, when the amount PS2 reaches S30, the tactile force RT2 reaches F13.

The tactile force RM2 exerted by a motor 260b is not generated until the amount PS2 reaches S20. When the amount PS2 reaches S20, the tactile force RM2 starts steeply increasing, and when the amount PS2 subsequently reaches S30, the transmission information TJ2 rises from a LOW level to a HIGH level so as to change the transmission of a vehicle. At this point, the transmission starts a kick-down, and the tactile force RM2 exerted by the motor 260b which has been increasing starts steeply decreasing, accordingly. In this connection, the tactile force RM2 takes a local maximum F12 when the amount PS2 reaches S30. When the amount PS2 reaches S40, the motor 260b comes to a stop, making the tactile force RM2 zero. Accordingly, the transmission information TJ2 changes from the HIGH level to the LOW level.

A summation of the tactile forces RT2 and RM2 exerted respectively by the spring and the motor 260b makes the pedal tactile force RP2. For example, F13 of the tactile force RT2 and F12 of the tactile force RM2 at S30 of the amount PS2 result in a local maximum F11 of the pedal tactile force RP2.

It may be possible to save the power consumed by the vehicle by introducing the pedal tactile force RP2 generated by a combination of the tension coil spring 720 and the motor 260b, because it is only necessary for the motor 260b to operate while the amount PS2 of pedal depression falls in a rang of S20 to S40. Furthermore, compared with a system which generates the pedal tactile force only by the motor 260b, it may be possible to adopt a motor with a smaller output power and reduce the cost associated with the motor.

In this way, it is feasible to select a more compact motor because it is possible to decrease the power required of the motor by use of the tension coil spring 720.

However, it is necessary to provide a hysteresis of the accelerator pedal between its depression and restoration so that the operability of the vehicle can be improved. The reason why the hysteresis is necessary can be understood if a system without hysteresis is assumed as an example. When the system does not have the hysteresis, it makes the control of the pedal difficult in such cases as constant-speed cruising and vibration of the vehicle on an uneven road, because the pedal tends to move too sensitively in response to a negligible change in force imposed on the pedal. In order to overcome a drawback described above, the motor 260b is kept being in operation during the pedal restoration.

The applicant of the present invention also filed Japanese Patent Application 2002-66374 (Japanese Published Patent Application 2003-260948) "VEHICLE TRANSMISSION", which discloses related arts. In this document, a vehicle transmission is disclosed, which can change a shift pattern and a shift lever position with an electric force, so that the operability of a vehicle is improved. FIG. 12 is a block diagram showing a conventional transmission apparatus A. FIGS. 13A and 13B are schematic diagrams illustrating transmission patterns (shift patterns): FIG. 13A for an automatic transmission pattern and FIG. 13B for a manual transmission pattern, respectively. As shown in FIGS. 12, 13A and 13B, the transmission apparatus A includes a shift lever 910, a direction sensor 930, an engine control unit (ECU) 940, a mode selection switch 970, an actuator 990 for forward-backward tactile force and a monitor 200. If the monitor 200 shows the automatic transmission pattern as shown in FIG. 13A, a predetermined detent force is exerted on the shift lever 910 according to the selected positions P, R, N—. This force is given in such a manner that it is exerted as a small tactile force in a direction of sliding of the shift lever before its manipulation and subsequently as another tactile force to guide it to the next shift position.

Next in the manual transmission pattern as shown in FIG. 13B, when the shift lever 910 is moved forward or backward with regard to a neutral position (base position) M, a predetermined tactile force is determined by an operational tactile force control module (not shown) and the signal indicative of the tactile force is delivered to the actuator 990 (see FIG. 12). When the shift lever 910 is released, the ECU 940 delivers a signal to the actuator 990, which is indicative of slow restoration of the shift lever 910 to the neutral position M.

Another apparatus for generating a tactile force for a vehicle is also disclosed. This apparatus provides each one of a plurality of objects, which is selected by a driver to manipulate, with a tactile force correlated with it. In other words, the tactile force varies from one object to another. When the driver manipulates the object while the tactile force is exerted on it, the driver experiences a tactile impression associated with such as manipulating a shift lever, depressing a pedal or touching an air conditioner switch. In parallel to this, the selected object is controlled according to a position of the object as a result of manipulation by the driver.

As shown in FIG. 14, for example, an apparatus 900 for generating a tactile force for a vehicle has an engine control unit (ECU) 700. The apparatus 900 further includes a pedal device 720 having a pedal 720a on which a foot of the driver rests and an arm 720b. The arm 720b is coupled to a stroke simulator 760 via a shaft 740. When the pedal 720 is depressed, the shaft 740 moves into the stroke simulator 760, which generates a tactile force according to an amount of working oil coming into the stroke simulator 760. In this way, the tactile force according to a stroke of the pedal 720 is exerted on the pedal assembly 720. A stroke sensor 780, which delivers an electric signal according to the stroke of the pedal 720 to the ECU 700, is attached to the shaft 740. The ECU 700 detects the stroke of the pedal assembly 720 according to the output signal of the stroke sensor 780. A throttle unit 840 provides a brake unit 860 with a command signal so that a throttle angle or a brake force according to the stroke of the pedal assembly 720 can be implemented. For example, Japanese Published Patent Application 2001-105926 reports the related arts.

However, it was necessary to keep a motor in operation during the restoration of a pedal so as to provide a hysteresis relative to the depression aiming at the better operability of a vehicle. Furthermore, it was demanded that the motor be activated much less frequently so as to save power.

The motor, which generates a tactile force for an accelerator pedal during its depression and restoration, provides the driver of a vehicle with a tactile impression for its maneuver via the accelerator pedal. It was necessary to elaborate on the compactness of the motor for power saving.

It was also necessary to activate a motor less frequently, which is used for generating a detent force for a shift lever, so as to achieve power saving.

SUMMARY OF THE INVENTION

The present invention seeks to provide an apparatus for generating a tactile force for a vehicle, which is able to control a tactile force and a tactile impression for at least one of an accelerator pedal and a shift lever, thereby not only providing a driver with an optimum tactile force but also appropriately controlling the transmission of a vehicle.

According to an aspect of the present invention, an apparatus for generating tactile force for a vehicle is provided, which includes a motor for generating the tactile force, a spring for generating the tactile force, an electromagnetic brake for cooperatively generating the tactile force with at least one of the motor and the spring, an accelerator pedal and a shift lever. The apparatus generates the tactile force for at least one of the accelerator pedal and the shift lever with a drive-by-wire method.

The apparatus described above, which has the electromagnetic brake and at least one of the motor and the spring, can generate the tactile force by drive-by-wire so that the tactile force and the tactile impression can be efficiently controlled for at least one of the accelerator pedal and the shift lever.

According to another aspect of the present invention, an apparatus further includes a detector, a throttle control unit and a pedal tactile force generator. The detector detects an amount of depression of the accelerator pedal. The throttle control unit controls a throttle angle according to a signal indicative of the amount of depression detected by the detector. The pedal tactile force generator provides the accelerator pedal with the tactile force according to the signal. The apparatus controls the tactile force according to the signal, and at least one of the motor and the electromagnetic brake is adapted to have a hysteresis of the tactile force so that the accelerator pedal can be restored more lightly than when the pedal is depressed.

This makes the tactile force during restoration of the accelerator pedal smaller than during depression, thereby achieving an efficient control for the tactile force and the tactile impression of the accelerator pedal.

According to still another aspect of the present invention, an apparatus further comprises a unit for pedal tactile force and transmission control which not only controls the pedal tactile force generator so that the tactile force takes a local maximum when the accelerator pedal is depressed by a predetermined amount, but also sends a signal indicative of speed change to an automatic transmission of the vehicle so as to control the transmission.

The apparatus described above, which conducts a kick-down according to the signal indicative of the amount of depression for the accelerator pedal and generates the tactile force for it, can accurately and easily synchronize the kick-down at the depression of the accelerator pedal providing a desired throttle angle with an occurrence of local maximum of tactile force. Furthermore, it may be possible to easily change the timing of the kick-down and the occurrence by use of the unit for pedal tactile force and transmission control and the throttle control unit. In this way, the apparatus can efficiently control the tactile force and the tactile impression for the accelerator pedal.

According to yet another aspect of the present invention, an apparatus is provided, in which while the shift lever is in an automatic mode, the unit for pedal tactile force and transmission control controls the pedal tactile force generator so that the tactile force takes the local maximum when the accelerator pedal is depressed by the predetermined amount, and while the shift lever is in a manual mode, the unit controls the generator so as not to generate the local maximum.

The apparatus described above, which is able to easily switch the presence of the local maximum of the tactile force for the accelerator pedal depending on the automatic transmission traveling and the manual transmission traveling, can efficiently control the tactile force and the tactile impression for the accelerator pedal.

According to a further aspect of the present invention, an apparatus is provided, in which while the vehicle is traveling at a constant speed in a cruise control mode, the apparatus controls the pedal tactile force generator so as to hold the accelerator pedal at a position in accordance with a throttle angle correlated with the constant speed.

The apparatus described above can efficiently control the tactile force and the tactile impression for the accelerator pedal because it is able to promptly accelerate the vehicle by additionally depressing the accelerator pedal whose position is adapted to be in accordance with the throttle angle.

According to a still further aspect of the present invention, an apparatus is provided, in which while the vehicle is traveling at the constant speed in the cruise control mode, the apparatus controls the pedal tactile force generator in a process including the following steps: restoring the accelerator pedal to its stroke start point; providing the accelerator pedal with a smaller tactile force until the accelerator pedal reaches a position in accordance with a throttle angle; and not only canceling constant-speed traveling but also increasing a tactile force for the accelerator pedal if the throttle pedal is depressed beyond the position.

In the apparatus described above, the tactile force for the accelerator pedal is adapted to be smaller while the accelerator pedal lies between the stroke start position and the other position which is correlated with the throttle angle during the constant speed traveling. Once the accelerator pedal is depressed beyond this throttle angle, the tactile force for the accelerator pedal is adapted to start increasing. In this way, the apparatus can efficiently control the tactile force and the tactile impression for the accelerator pedal because it helps the driver to easily recognize the position of the accelerator pedal at which the vehicle starts acceleration.

According to a yet further aspect of the present invention, an apparatus further includes a position detector, a mode selection switch, a set-up unit, a shift lever tactile force generator and a transmission control module. Description is given to each of these components. The position detector detects a position of the shift lever. The mode selection switch selects a mode for the shift lever from a plurality of modes. The set-up unit establishes a virtual control panel, whose configuration is representative of the mode selected by the mode selection switch. The shift lever tactile force generator generates the tactile force for the shift lever according to the position of the shift lever in accordance with the configuration of the virtual control panel. The transmission control module controls a transmission of the vehicle according to the position of the shift lever.

When the automatic mode is selected with the mode selection switch, the set-up unit establishes the virtual control panel which is correlated with the selected mode. If a driver shifts the shift lever to his desired position, the apparatus makes the driver feel the tactile force via the shift lever according to the position of the shift lever virtually displayed on the control panel. The position of the shift lever is then detected by the position detector, and the transmission control module controls the transmission according to the signal delivered by the position detector. On the other hand, during the manual mode, the set-up unit similarly establishes this mode on the virtual control panel and the apparatus can not only make the driver feel an appropriate tactile force but also implement appropriate control for the transmission.

According to another aspect of the present invention, an apparatus is provided, which has a display near a bottom potion of the shift lever for visualizing the virtual control panel which is established by the set-up unit.

The apparatus described above, which is able to visualize the virtual control panel which is established by the set-up unit, helps the driver when he manipulates the shift lever.

According to still another aspect of the present invention, an apparatus has the plurality of modes including a first mode and a second mode. The first mode is an automatic mode in which the position of the shift lever is selectable from a plurality of automatic positions by manipulating the shift lever. On the other hand, the second mode is a manual mode in which the transmission of the vehicle can be shifted by tilting the shift lever back and forth.

The apparatus described above, which visualizes the image of control panel on the display near the shift lever, allows the driver to select the automatic positions by manipulating the shift lever back and forth, because the automatic positions are arrayed in a line in a backward-forward direction as the first operational mode. In contrast to it, during the manual mode as the second operational mode, the display shows the image of an control panel indicating that forward tilting of the shift lever results in shift-up and backward tilting shift-down. In this way, the apparatus can not only provide the driver with the appropriate tactile force but also appropriately control the transmission because the driver is allowed to conduct the manual shift just by tilting the shift lever back and forth.

According to yet another aspect of the present invention, an apparatus is provided, in which the shift lever is able to serve as the mode selection switch when a driver of the vehicle exerts a force sideways on the shift lever.

The apparatus described above, which allows the driver to switch from the automatic to manual mode and vice versa by exerting force sideways on the shift lever, can not only provide the driver with the appropriate tactile force but also appropriately control the transmission.

According to a further aspect of the present invention, an apparatus further includes a detent force control unit for controlling a detent force acting on the shift lever while the shift lever is moving from one automatic position to another. When a driver of the vehicle happens to shift the shift lever by not less than two positions relative to its current position, the detent force control unit produces a greater tactile force for the shift lever so that inadvertent excess of shifting by the driver can be prevented.

The apparatus described above, which has the arrayed automatic positions of P (parking), R (rear), N (neutral) and D (drive) in a forward-backward line, the position detector detects the position of the shift lever and delivers its signal to the detent force control unit, when the shift lever is in the position D. The detent force control unit analyzes the intention of the driver according to the information delivered by a vehicle speed sensor, an engine rotation detector, a throttle angle sensor and a brake operational sensor, thereby controlling the tactile force. When the vehicle speed is not less than a predetermined value while the shift lever is in the position D, the detent force control unit provides the shift lever with the greater tactile force for the shifting from the position D to R, two positions apart from each other. On the other hand, when the vehicle speed is not more than the predetermined value, the detent force control unit does not provide the greater tactile force. In this way, the apparatus can prevent excessive shifting of the shift lever inadvertently made by the driver According to a still further aspect of the present invention, an apparatus is provided, in which when one of shifting up and shifting down by the shift lever is not effective, the shift lever tactile force generator produces a greater tactile force for the shift lever so as to notify a driver of the vehicle of ineffectiveness.

When the shift lever is tilted forward to sequentially shift up the transmission from the first speed, shifting up will be impossible even if the shift lever is further tilted forward once the transmission is set in the highest position. When this condition occurs, the apparatus described above is able to exert a greater tactile force on the shift lever with the tactile force generator, so that the apparatus can restrict the shift lever from being further forwardly tilted. In this way, the apparatus can not only provide the driver with the appropriate tactile force but also appropriately control the transmission.

According to a yet further aspect of the present invention, an apparatus is provided, in which the detent force control unit produces a greater tactile force for the shift lever in a particular direction according to vehicular traveling conditions and positions of the shift lever, even if the shift lever is manipulated against the greater tactile force, the transmission control module keeps sending a signal which is generated based on a position of the shift lever before its manipulation, and when a force exerted by the driver on the shift lever is decreased, the detent force control unit controls the detent force so that the shift lever slowly returns.

When the shift lever is in the position P while the vehicle is at a stop, the apparatus described above exerts a greater tactile force on the shift lever during shifting from P to R with the detent force control unit so that the shift lever can not be shifted to the position R. In case the driver accidentally manipulates the shift lever against the increased tactile force, the transmission control module keeps sending the signal indicative of the position P. When the driver releases the force exerted on the shift lever, it can gradually return to the previous position P. In this way, the apparatus can not only provide the driver with the appropriate tactile force but also appropriately control the transmission.

BRIEF DESCRIPTION OF THE DRAWINGS

FIG. 13A and FIG. 13B are plan views showing patterns for automatic and manual modes of a conventional apparatus, respectively.

DESCRIPTION OF THE PREFERRED EMBODIMENTS

Embodiments of the present invention are now described with reference to the accompanying drawings.

a. First Embodiment

Figure 1:
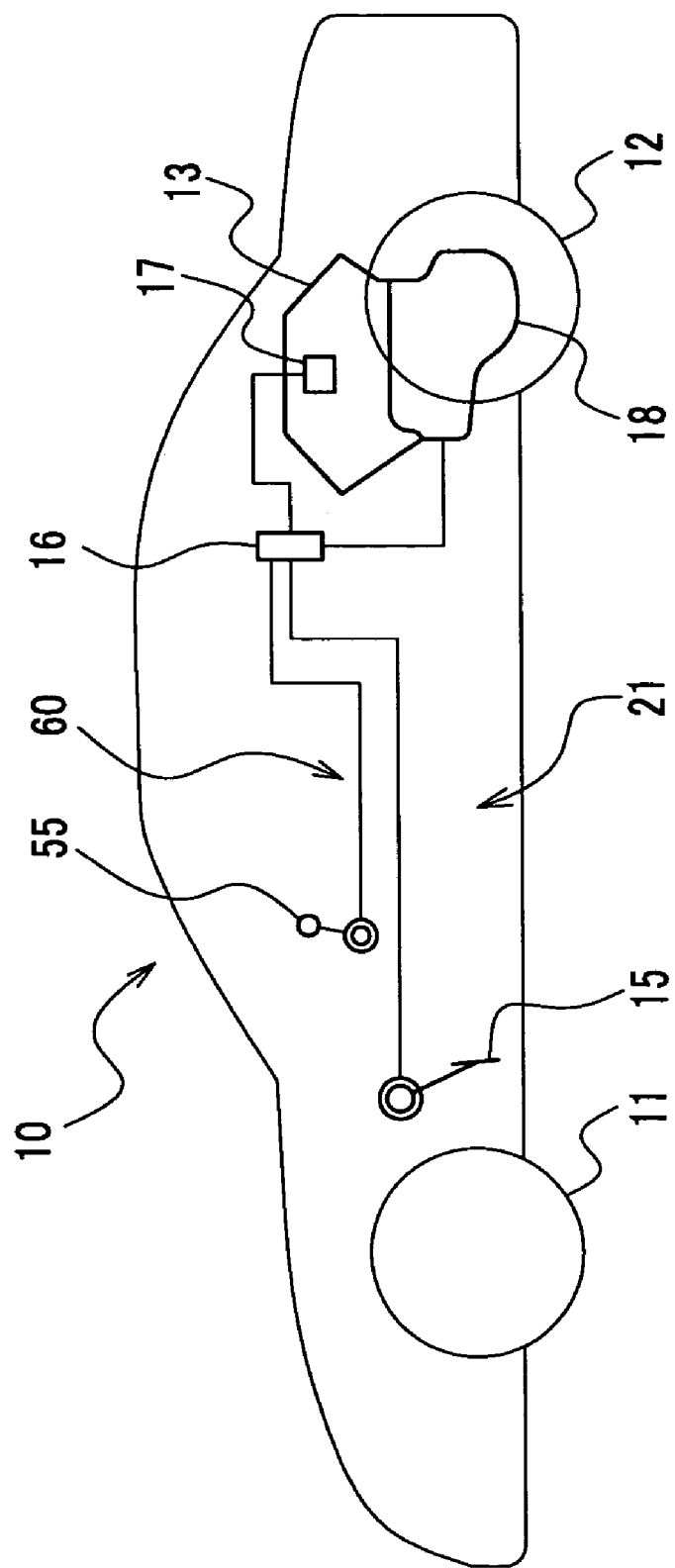
FIG. 1 is a schematic diagram illustrating a vehicle to which an apparatus for generating tactile force according to the present invention is applied.

FIG. 1 is a schematic diagram illustrating a vehicle 10 to which an apparatus 21 for generating tactile force is applied. The vehicle 10 has an engine 13 which is disposed between front and rear wheels 11 and 12, closer to the rear wheels 12. Manipulation of an accelerator pedal 15, which is disposed at a relatively front portion of the vehicle 10, activates a throttle control unit or an engine control unit 16 (hereinafter referred to as "ECU") to determine a throttle angle of a throttle valve 17 so that an output power of the engine 13 can be controlled. In addition, the ECU 16 sends a command signal according to the manipulation of the accelerator pedal 15, thereby controlling an automatic transmission 18 coupled to the engine 13. Numeral 60 represents an apparatus for generating tactile force having a shift lever 55.

Although the accelerator pedal 15 and the throttle valve 17, which generally speaking are mechanically coupled to each other with a slot cable, for example, the vehicle 10 employs structure referred to as Drive By Wire (DBW). It introduces wires so as to electrically connect via the ECU 16 the accelerator pedal 15 and a throttle valve driver 32 (see FIG. 2), which provides a drive force for the throttle valve 17. This DBW is called a drive technique by electric wires, which employs a virtual load generated by a drive unit.

As a result of selecting the structure described above, it is possible to increase a response of opening and closing of the throttle valve 17 according to the manipulation of the accelerator pedal 15, which accordingly increases a response in controlling an output power of the engine 13. Furthermore, it is possible to utilize an electric signal delivered by the accelerator pedal 15 for activating the automatic transmission 18, for controlling a detent force for the shift lever 55 and the like as well as for driving the throttle valve 17.

Figure 2:
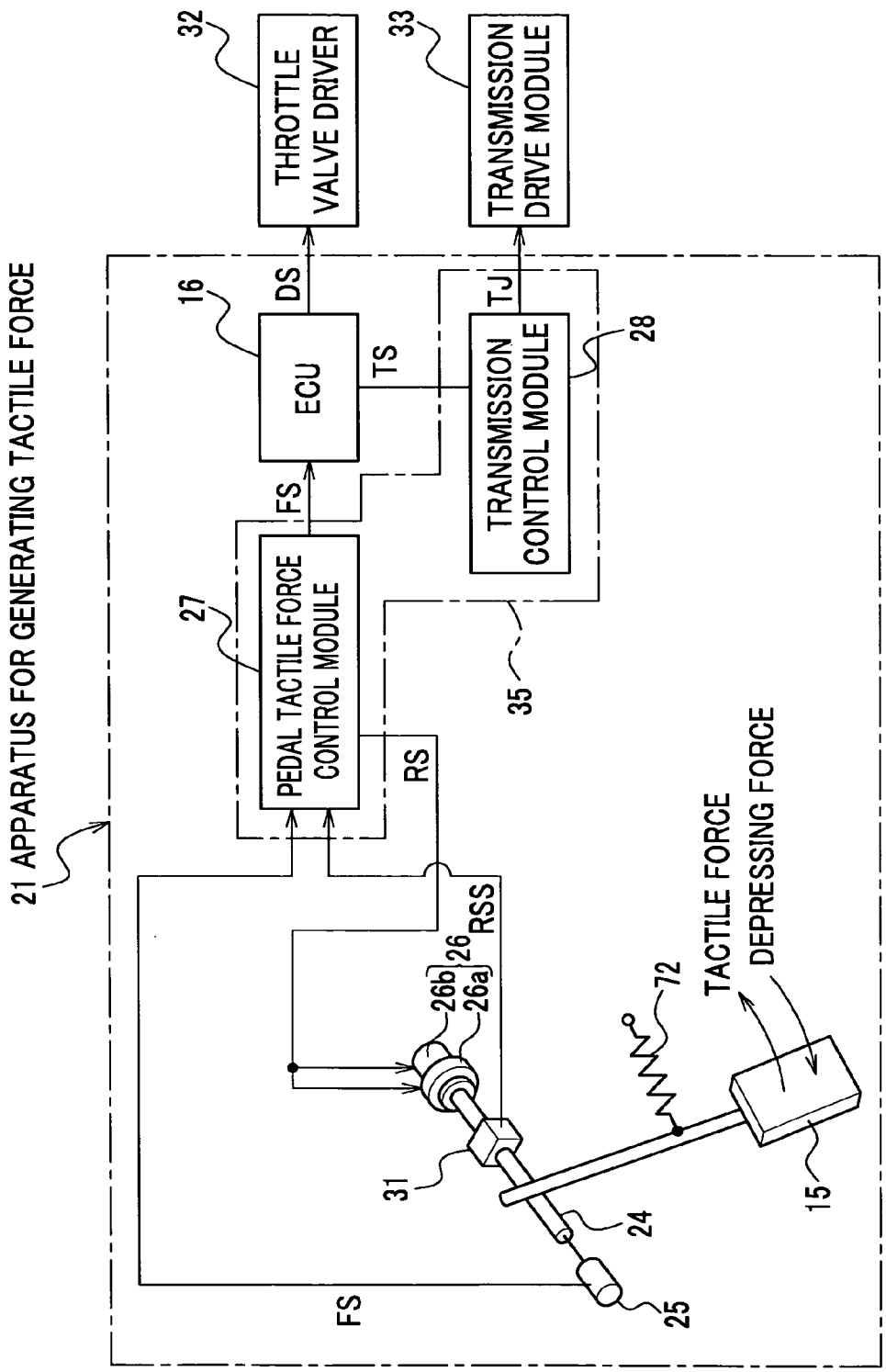
FIG. 2 is a block diagram showing the structure of an apparatus for generating tactile force according to the present invention.

FIG. 2 is a block diagram illustrating the structure of the apparatus 21 according to the present invention. The apparatus 21 has the accelerator pedal 15, a pedal shaft 24, an accelerator pedal detector 25, a tension coil spring 72, a pedal tactile force generator 26, a pedal tactile force control module 27, the ECU 16, a transmission control module 28 and a detector 31 for detecting pedal tactile force. Brief description is given to each of these components. The detector 25 is coupled to an end of the pedal shaft 24, which serves as a pivotal axis for the accelerator pedal 15, so as to detect an amount of its depression. According to a signal FS indicative of pedal depression sent by the detector 25, the tension coil spring 72 provides the accelerator pedal 15 with a tactile force, which oppositely acts relative to that exerted by a driver for depressing the accelerator pedal 15. The pedal tactile force generator 26 is coupled to the other end of the pedal shaft 24. The pedal tactile force control module 27, which sends a signal RS indicative of pedal tactile force to the pedal tactile force generator 26 according to the signal FS, controls a tactile force for the accelerator pedal 15. The ECU 16 serves as a throttle control unit, receiving the signal FS from the pedal tactile force control module 27. The transmission control module 28 receives a signal TS indicative of speed change which is generated by the ECU16 according to the signal FS. The detector 31, which is disposed on the pedal shaft 24, not only detects a tactile force generated by the pedal tactile force generator 26, but also sends a signal RSS indicative of pedal tactile force to the pedal tactile force control module 27.

When the ECU 16 sends a drive signal DS to a throttle valve driver 32 according to the signal FS indicative of pedal depression, the driver 32 varies the throttle angle by opening and closing the throttle valve 17 (see FIG. 1). The transmission control module 28 sends transmission information TJ to a transmission drive module 33 disposed in the automatic transmission 18 (see FIG. 1) according to the signal TS indicative of speed change, thereby controlling the module 33. In this way, the module 33 drives the automatic transmission 18.

The accelerator pedal detector 25, which is a rotational angle sensor detecting a rotational angle of the pedal shaft 24, detects an amount of depression of the accelerator pedal 15 in the form of a pivotal angle.

The pedal tactile force generator 26 includes an electromagnetic brake 26a and a motor 26b, which have output shafts adapted to be coaxial and mechanically coupled to the pedal shaft 24.

The electromagnetic brake 26a has magnetic powder and a coil. The brake 26a is categorized as a powder type, which tends to be widely used for an electromagnetic brake that is subjected to operation under continuous slip conditions. Generally speaking, there are also a friction plate type and an engagement type in addition to the powder type. The friction plate type has a drawback that the life of its lining tends to be short when it is used under continuous slip conditions. On the other hand, the engagement type is used when it experiences operation having two distinguishable modes, complete braking and release. The electromagnetic brake of powder type suffers from temperature increase in the powder due to heat attributed to friction energy while the brake is under slip operation. Heat dissipated by the coil while it is activated in addition to that stemming from the friction energy requires cooling for the brake. Cooling methods such as natural convection cooling, forced convection cooling, fluid cooling and cooling with heat pipes are available. Although natural convection cooling is applied to the present embodiment, it may be possible to select another one or a combination of any methods.

The pedal tactile force control module 27 controls a position of pedal depression and a tactile force (local maximum) according to a signal FS indicative of pedal depression and a signal RSS indicative of pedal tactile force. A combination of the module 27 and the transmission control module 28 is referred to as a unit 35 for pedal tactile force and transmission control.

Description is now given to operation of the apparatus 21 for generating tactile force described above.

Figure 3:
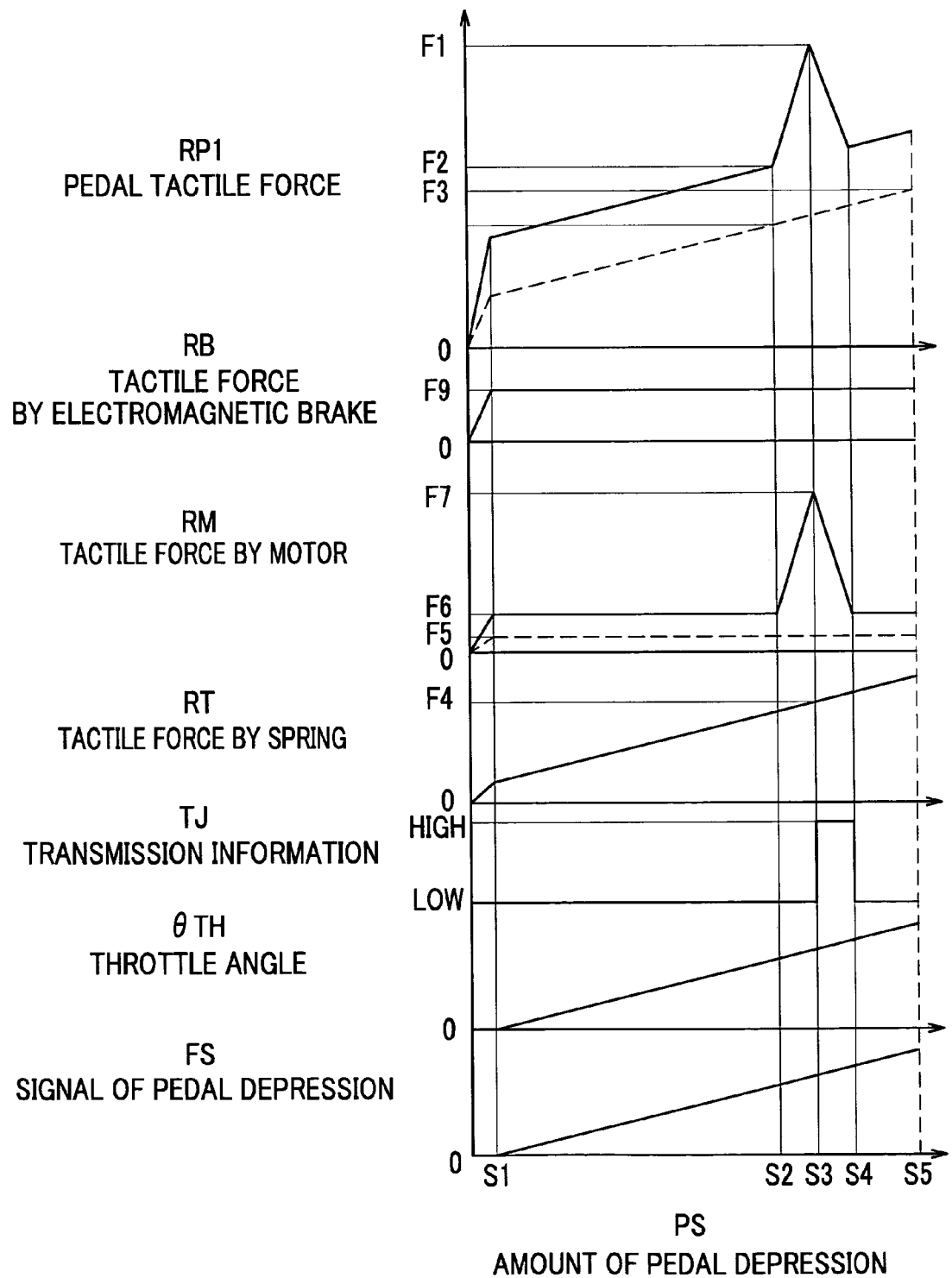
FIG. 3 is a graph depicting operation of an apparatus for generating tactile force according to the present invention.

FIG. 3 is a graph depicting operation of the apparatus 21 (see FIG. 2) according to the present invention. The horizontal axis represents an amount PS of depression of the accelerator pedal 15. Brief description is given to each of the signals described along the vertical axis shown in FIG. 3 from the bottom to the top. The signal FS indicative of pedal depression is a signal sent by the accelerator pedal detector 25. θTH represents a throttle angle. The transmission information TJ is a signal generated by the transmission control module 28. The tactile force RT, which is generated by the tension coil spring 72 (see FIG. 2), acts on the accelerator pedal 15. The tactile force RM, which is generated by the motor 26b, acts on the accelerator pedal 15. A tactile force RB, which is generated by the electromagnetic brake 26a, acts on the accelerator pedal 15. A pedal tactile force RP1 represents a tactile force which is a summation of the tactile forces RT, RM and RB.

When a driver depresses the accelerator pedal 15 (see FIG. 2), the signal FS indicative of pedal depression starts to increase when the amount PS of pedal depression has reached S1. The throttle angle θTH accordingly starts to increase when the amount PS has reached S1. The throttle angle θTH is substantially proportional to the signal FS.

The tactile force RT abruptly increases as the amount PS varies from zero to S1. After the amount PS reaches S1, the tactile force RT progressively increases according to the increase of the amount PS. When the amount PS equals S3, the tactile force RT takes a value F4.

The tactile force RM suddenly increases while the amount PS varies from zero to S1, thereafter keeping a constant value F6 until S2. When the amount PS exceeds S2, the tactile force RM suddenly starts to increase. When the amount PS reaches S3, the transmission information TJ shifts from a LOW level to a HIGH level, which triggers the transmission drive module 33. At this point, the module 33 starts a kick-down and the tactile force RM suddenly starts to decrease. The tactile force RM takes a local maximum F7 when the amount PS equals S3. When the amount PS further increases to reach S4, the transmission information TJ shifts from the HIGH to LOW level, so that the tactile force RM returns to the constant value F6. If a driver starts restoring the accelerator pedal 15 when the amount PS equals S5, a smaller force F5 than the force F6 is applied so that hysteresis with regard to the force F6 which is generated during depression of the accelerator pedal 15 can be established. In this way, it is possible to decrease the tactile force for the accelerator pedal 15 while it is being restored. In this connection, it may be possible to select a zero for each of the tactile forces F5 and F6, or other values as the case may be.

The tactile force RB suddenly increases while the amount PS varies zero to S1. Subsequently, after the amount PS exceeds S1, the tactile force RB keeps a constant value F9 independent of an increase in the amount PS. This constant force F9 serves as a resistive force acting on the accelerator pedal 15. If the driver starts restoring the accelerator pedal 15 when the amount PS equals S5, the force F9 turns to a resistive force according to a decrease in the amount PS, against a tactile force which acts on the accelerator pedal 15 so as to restore it. In this way, the tactile force for the accelerator pedal 15 has a hysteresis, and the accelerator pedal 15 is given a smaller tactile force when it is restored than when it is depressed.

The pedal tactile force RP1 is a summation of the tactile forces RT, RM and RB. The force RP1 suddenly increases while the amount PS of pedal depression varies zero to S1, and it increases according to an increase in PS after PS exceeds S1. When the amount PS further increases to reach S2, the force RP1 reaches a value F2. When the amount PS further reaches S3, the transmission information TJ, which shifts from the LOW level to the HIGH level, triggers the transmission drive module 33, so that the force RP1 takes a local maximum F1. At this point where a kick-down begins, the force RP1 suddenly starts decreasing. After the amount PS reaches S4, the force RP1 progressively increases according to an increase in PS. The solid line shown in FIG. 3 represents the pedal tactile force RP1 when the pedal is depressed. If the driver restores the accelerator pedal 15 when the amount PS equals to S5, the force RP1 suddenly drops to a value F3, then progressively decreasing. The dotted line in FIG. 3 represents the force RP1 when the accelerator pedal 15 is restored. Starting from the value F3, a smaller tactile force than when the pedal 15 is depressed is kept according to a decrease in the amount PS. The force RP1 progressively decreases according to the decrease in the amount PS, showing the hysteresis with regard to the tactile force generated for the accelerator pedal 15 during depression. In this way, the pedal tactile force RP1 for the accelerator pedal 15 is adapted to be smaller when it is restored. In addition, when the driver restores the accelerator pedal 15 after depressing it halfway, the apparatus 21 controls the tactile force so that the hysteresis can be kept between depression and restoration of the accelerator pedal 15.

The pedal tactile force control module 27 electrically controls the pedal tactile force generator 26 so as to generate a pedal tactile force. This is the reason why it is possible to conduct an optimum control which enables not only generation of a local maximum in the pedal tactical force RP1 when the accelerator pedal 15 is depressed but also prohibition against the generation when it is restored.

The hystereses inherent to the friction of a throttle cable (not shown) and to a motor when a throttle valve 17 is mechanically driven are instead mainly generated by the electromagnetic brake 26a (a micro-powder brake employing electric powder) in the present embodiment. In this way, the apparatus 21 generates a braking force (a tactile force) for the accelerator pedal 15 in such a manner that the force is adapted to be greater when the accelerator pedal 15 is depressed than when it is restored. This results in an optimum control for the accelerator pedal 15, through which a driver can feel the traveling conditions of a vehicle, in terms of a tactile force and operational feeling provided to him. Furthermore, the apparatus 21 efficiently controls the three tactile forces described above, thereby saving power consumption. In this connection, it is possible to select a smaller motor by reducing the output power required of the motor.

Figure 4A:
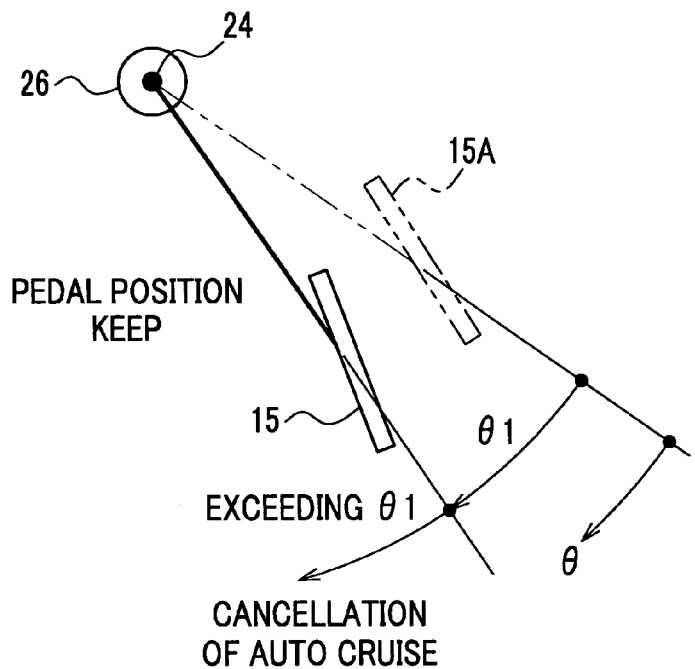
FIG. 4A is a schematic diagram illustrating operation of an accelerator pedal which is held at a depression angle θ1.
Figure 4B:
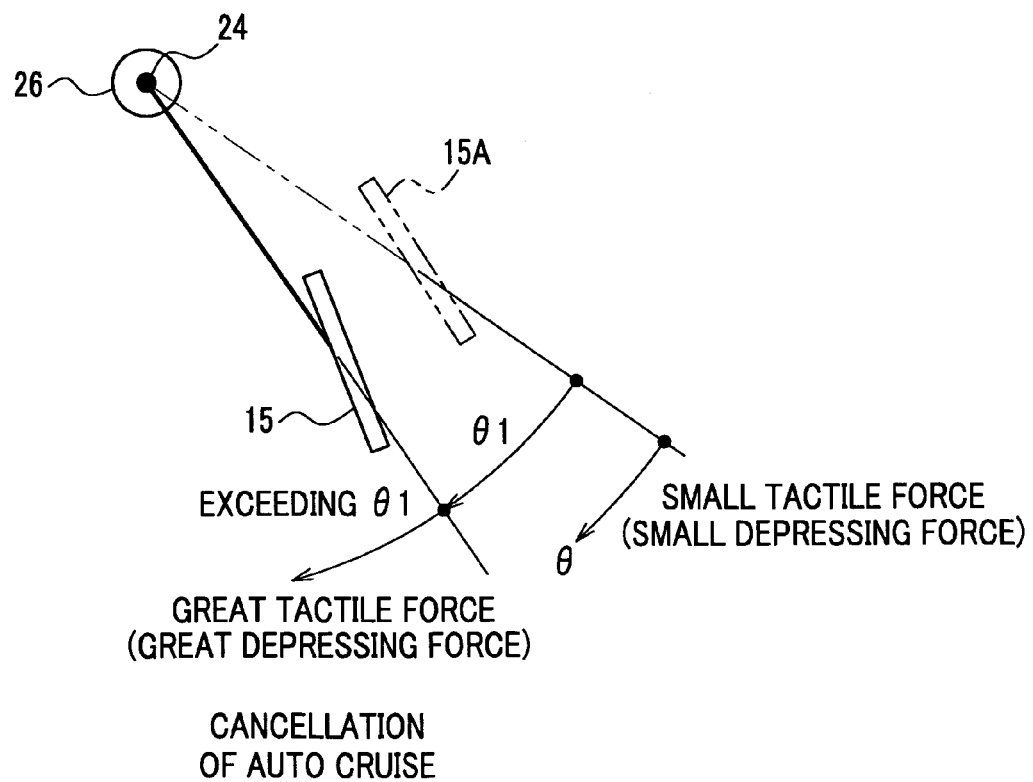
FIG. 4B is a schematic diagram illustrating an accelerator pedal which is being restored to a stroke start point.

Referring to FIGS. 4A and 4B, description is given to other examples, to which the apparatus 21 according to the present invention is applied. An accelerator pedal 15 is mounted to a vehicle 10 (see FIG. 1), which has a cruise control unit (not shown) that is capable of controlling a constant speed of the vehicle 10, relieving a driver from manipulating the accelerator pedal 15. When the driver turns on a cruise control switch (not shown) during vehicular traveling, the cruise control unit holds the throttle angle of a throttle valve 17 (see FIG. 1) fixed which he sets by the switch, so that the vehicle 10 can travel at a constant speed. Numerals 24 and 26 represent a pedal shaft and a pedal tactile force generator 26, respectively.

As shown in FIGS. 4A and 4B, $\theta$ represents an angle of depression of the accelerator pedal 15 relative to its starting point of stroke, which is meant to represent a position when no force is applied to the accelerator pedal 15. For convenience sake, the initial position of the accelerator pedal 15 is distinguished as a stroke start position 15A. Suppose a case where the driver depresses the accelerator pedal 15 which is at the starting point and subsequently turns on the cruise control switch when the angle $\theta$ equals $\theta1$. Triggered by turning on, the pedal tactile force control module 27 commands the pedal tactile force generator 26 to generate a tactile force for the accelerator pedal 15 so that the angle $\theta1$ is kept and the vehicle travels at a constant speed, even if the driver removes his foot from the accelerator pedal 15.

If the driver further depresses the accelerator pedal 15 until the angle of depression $\theta$ exceeds $\theta1$, he can accelerate the vehicle 10 at will. If the driver subsequently removes his foot from the accelerator pedal 15, the angle of depression $\theta$ returns to $\theta1$, and the vehicle 10 resumes traveling at the same constant speed as that of the prior cruise control before he depresses the accelerator pedal 15. If he depresses the brake while the vehicle 10 is traveling at the constant speed, it is possible to cancel an auto cruise so that normal manipulation of the accelerator pedal 15 can be carried out without holding of the position of the accelerator pedal 15.

As shown in FIG. 4B, suppose a case where a driver depresses the accelerator pedal 15 from the stroke start position 15A and subsequently turns on the cruise control switch when the angle $\theta$ of depression for the accelerator pedal 15 reaches $\theta1$ during vehicular traveling. Triggered by turning on, the pedal tactile force control module 27 commands the pedal tactile force generator 26 to restore the accelerator pedal 15 to the stroke start position 15A when the driver removes his foot from the accelerator pedal 15.

When the driver depresses the accelerator pedal 15 from the stroke start position 15A again, the pedal tactile force control module 27 commands the pedal tactile force generator 26 so as to provide the accelerator pedal 15 with a smaller tactile force until the angle $\theta$ reaches $\theta1$ but a greater tactile force when $\theta$ exceeds $\theta1$, then giving a local maximum. To summarize, it is possible to reduce a depression force required of the driver before the angle $\theta$ reaches $\theta1$, but to increase it once $\theta$ exceeds $\theta1$.

As described above, it is possible to make the driver recognize an amount of depression of the accelerator pedal 15, namely the angle of depression $\theta1$, corresponding to a throttle angle during auto cruising, at which a driver can start acceleration of the vehicle 10, because depression forces required of the driver before and after $\theta1$ are separately defined. If the driver depresses the brake pedal during auto cruising at a constant speed, auto cruising is cancelled in the same manner as that shown in FIG. 4A. It is also possible to introduce a combination of three tactile forces described above for controlling the accelerator pedal 15 during auto cruising.

Figure 5A:
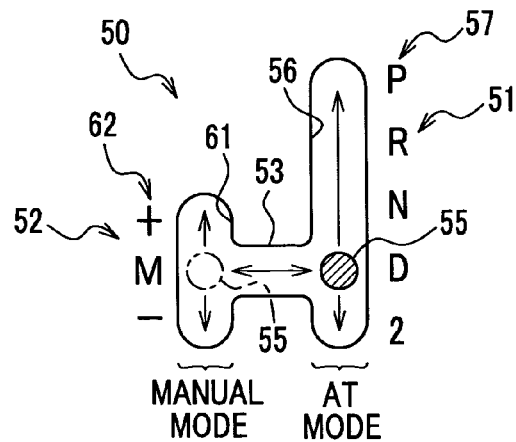
FIG. 5A is a schematic diagram illustrating a shift lever and related portions.
Figure 5B:
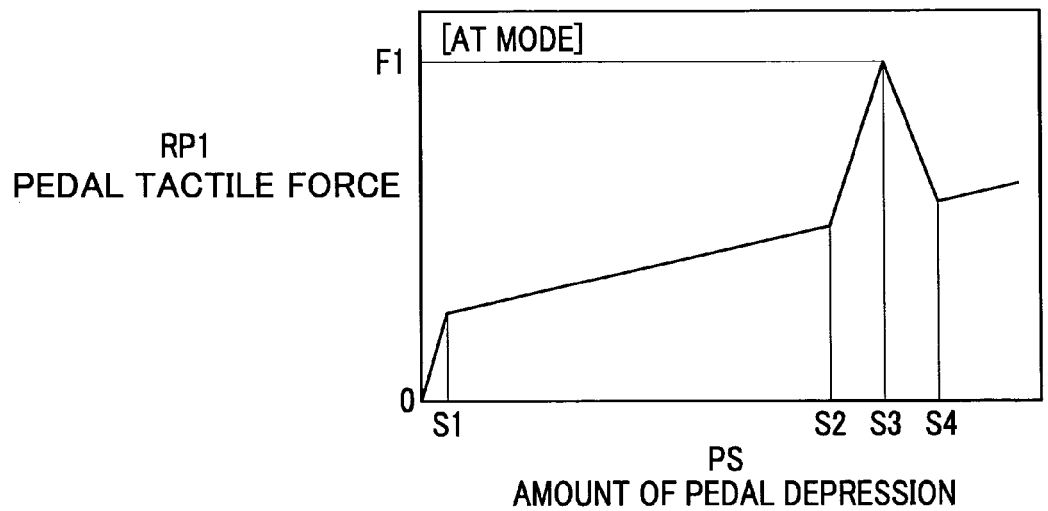
FIGS. 5B and 5C are graphs depicting the relationship between a pedal tactile force and an amount of pedal depression.
Figure 5C:
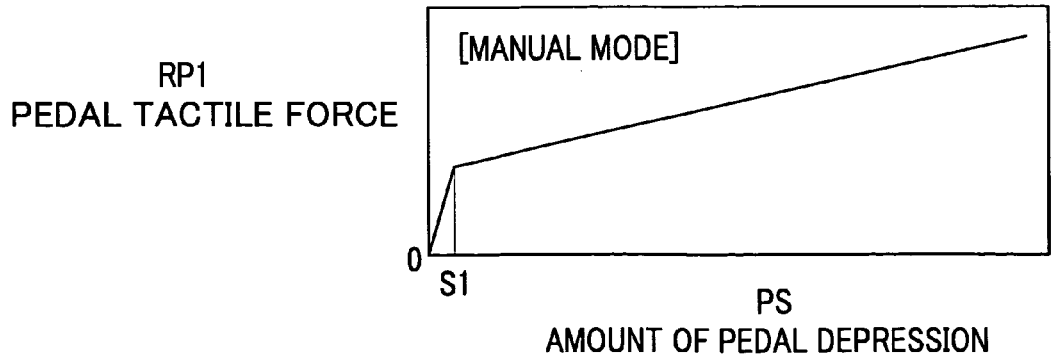

FIG. 5A is a schematic diagram illustrating a shift lever and related portions. FIGS. 5B and 5C are graphs depicting the relationship between a combined pedal tactile force and an amount of pedal depression.

As shown in FIG. 5A, a shift lever unit 50 includes an automatic portion 51 which has shifting positions for automatic transmission, a manual portion 52 which has shifting positions for manual transmission and a connection portion 53 which allows mechanical communication between the portions 51 and 52.

The automatic portion 51 has a first slit 56 through which a shift lever 55 moves and a first position indicator 57 which displays positions of the shift lever 55. The first position indicator 57 displays "P" showing a parking position for the shift lever 55, "R" for backward traveling, "N" for a neutral position, "D" for automatic transmission among all the speeds, "2" for automatic transmission between first and second speeds. A driver can place the shift lever 55 any one of these positions.

The manual portion 52 has a second slit 61 through which the shift lever 55 moves and a second position indicator 62 which displays positions of the shift lever 55.

The second position indicator 62 has "+" showing the position of shifting up of a gear by one step for the shift lever 55, "−" for shifting down by one step and "M" for a neutral position. The shift lever is not allowed to stay in the position "+" or "−" but forcefully made to return to the position "M".

The connection portion 53 is a slit which makes the first and second slits 56 and 61 communicate with each other. The shift lever 55 can move between the first and second slits via the connection slit 53.

A case where the shift lever is in the first slit 56 and automatic transmission can be carried out is hereinafter referred to as "AT mode". On the other hand, the other case where the shift lever 55 is in the second slit 61 and manual transmission can be carried out is hereinafter referred to as "manual mode". The automatic transmission 18 executes these "AT mode" and "manual mode".

As shown in FIG. 5B, the vertical axis represents a pedal tactile force RP1 for an accelerator pedal 15 in AT mode and the horizontal axis represents an amount PS of pedal depression. While a vehicle 10 is traveling in AT mode, a pedal tactile force control module 27 commands a pedal tactile force generator 26 so that the force RP1 takes a local maximum F1 when the amount PS equals S3.

As shown in FIG. 5C, the vertical axis represents the pedal tactile force RP1 for the accelerator pedal 15 in manual mode and the horizontal axis represents the amount PS of pedal depression. While the vehicle 10 is traveling in manual mode, the pedal tactile force control module 27 commands the pedal tactile force generator 26 so that the force RP1 takes no local maximum but another value according to the amount PS. For example, it may be possible to select a value proportional to the amount PS after it exceeds S1.

In this connection, it is possible to determine an optimal tactile force, which is produced by a combination of two kinds of tactile force, one generated by a motor and one by an electromagnetic brake, except for the other generated by a tension coil spring. This results in an increase in the operability of the shift lever 55.

The conventional apparatus, which has a switch for generating a local maximum for a pedal tactile force in AT mode, will also generate an unnecessary local maximum in manual mode. In contrast to this, an apparatus 21 for generating tactile force according to the present invention, which has the pedal tactile force control module 27, can control generation of a local maximum according to AT and manual modes. In other words, the apparatus 21 can determine whether or not it generates the local maximum according to the modes.

It may be possible to select other types of power source instead of a rotational motor which is adopted in the present embodiment as an example. A linear motor and actuators such as a combination of a hydraulic cylinder and a hydraulic pressure generator as well as another combination of an air cylinder and an air pressure generator may be alternatives. It may also be possible to electrically control the linear motor, the hydraulic pressure generator and the air pressure generator so as to control a pedal tactile force.

The apparatus 21, which mechanically generates a tactile force acting on the accelerator pedal 15 with the tension coil spring 72, is able to reduce another tactile force produced by the pedal tactile force generator 26. In this way, it is possible to reduce a load required of the generator 26, which leads to cost saving and a reduction in power consumption for the apparatus 21.

It is possible to accurately make a kick-down coincide with an occurrence of local maximum F1 because the apparatus 21 is able to obtain the throttle angle θTH, transmission information TJ and pedal tactile force RP1 according to the sole signal FS indicative of pedal depression. In this way, when a driver depresses the accelerator pedal 15 so as to accelerate the vehicle 10, he can feel the kick-down which is synchronized with clicking feeling given through the accelerator pedal 15. This will provide the driver with augmented sense of unity with the vehicle 10.

b. Second Embodiment

Figure 6:
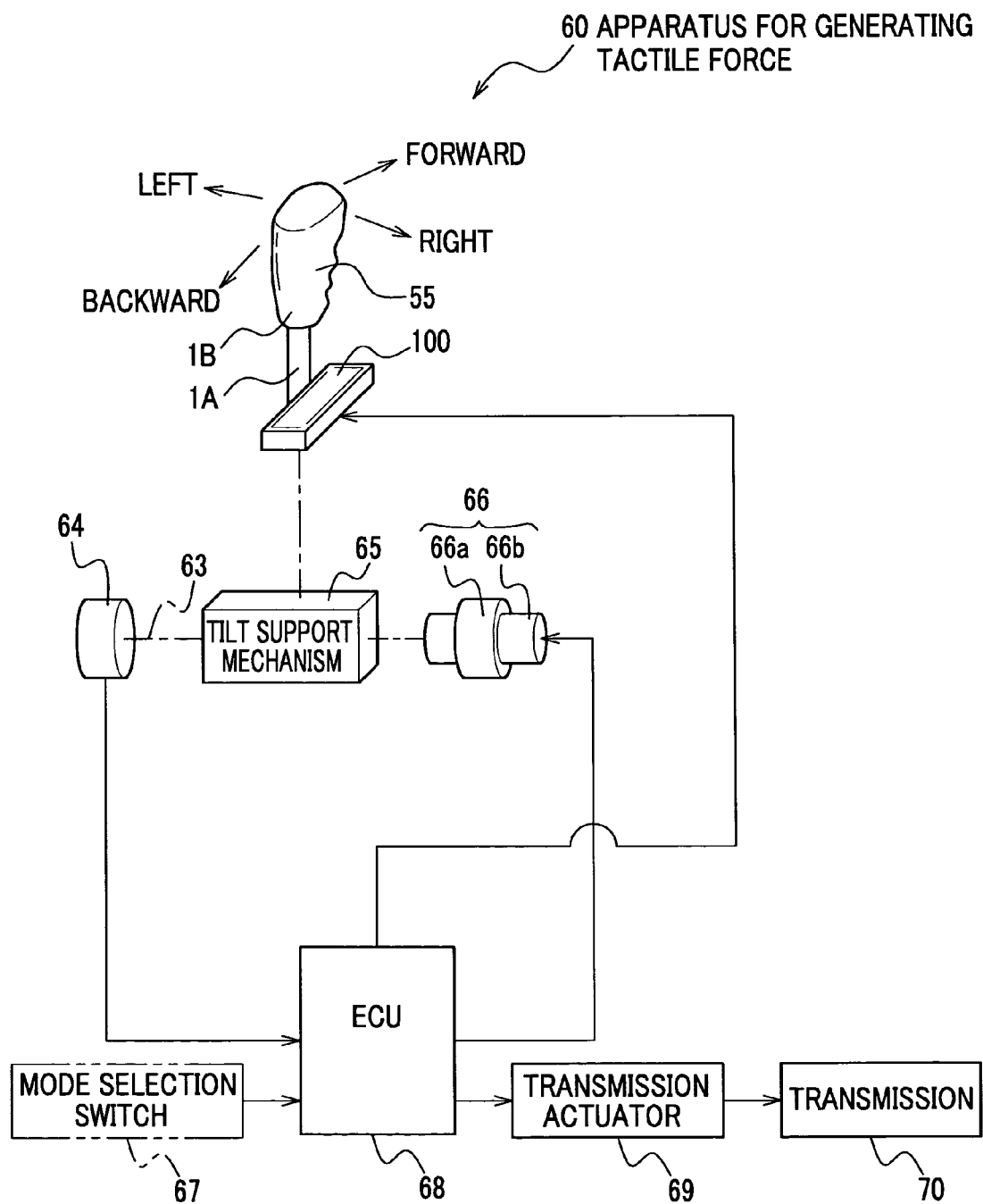
FIG. 6 is a block diagram showing the structure of an apparatus for generating tactile force according to the present invention.

FIG. 6 is a block diagram showing the structure of an apparatus for generating tactile force according to a second embodiment of the present invention.

As shown in FIG. 6, an apparatus 60 for generating tactile force includes a shift lever 55, a direction sensor 64, an engine control unit (ECU) 68, a mode selection switch 67, a tactile force generator 66, a monitor 100 and the like. The apparatus 60 carries out shift-by-wire control with the ECU 68 which sends a control signal to a transmission actuator 69 so as to control a transmission 70. In this technique, the shift lever 55 and the transmission 70 are mechanically separated. The tactile force generator 66 has an electromagnetic brake 66a and a motor 66b.

The direction sensor 64 is referred to as "position detector" in the appended claims, the ECU 68 as "set-up unit" and "transmission control module", the ECU 68 and the tactile force generator 66 as "shift lever tactile force generator" and "detent force control unit", and the monitor 100 as "display".

Description is given to the shift lever 55.

The shift lever 55 is disposed near a driver's seat so that a drive can easily have an access to it. The shift lever 55 has a grip 1B which is secured to the top end of a stick 1A. The bottom end of the stick 1A is supported by a tilt support mechanism 65 so that the stick 1A can tilt back and forth. An amount of tilting of the shift lever 55 is detected by the direction sensor 64 such as a potentiometer, which is mounted to a shaft 63 that allows a pivotal movement for the shift lever 55 via the tilt support mechanism 65. The direction sensor 64 sends the amount in the form of an electric signal to the ECU 68.

The tilt support mechanism 65 has the tactile force generator 66 which provides the shift lever 55 with a tactile force when a driver manipulates it back and forth. In this connection, the ECU 68 determines the amount and direction of the tactile force, which are to be described later.

Description is given to the mode selection switch 67.

The mode selection switch 67 is prepared for selection of one operational mode, which a driver brings into a practice via the shift lever 55, out of automatic and manual modes. The mode selection switch 67 is disposed on the monitor 100, for example, and the driver is able to switch from the automatic to manual mode or vice versa. When one of two modes is selected, a signal indicative of the mode is sent to the ECU 68. The ECU 68 establishes a virtual control panel which is adapted for the mode selected by the mode selection switch 67, thereby displaying the virtual control panel on the monitor 100.

Description is given to the monitor 100.

The monitor 100, which is made of a thin monitor of rectangular plate such as a liquid crystal panel in a direction of vehicle forward-backward direction, is disposed near the bottom end of the shift lever 55. The monitor 100 visualizes the virtual control panel established by the ECU 68.

Figure 7A:
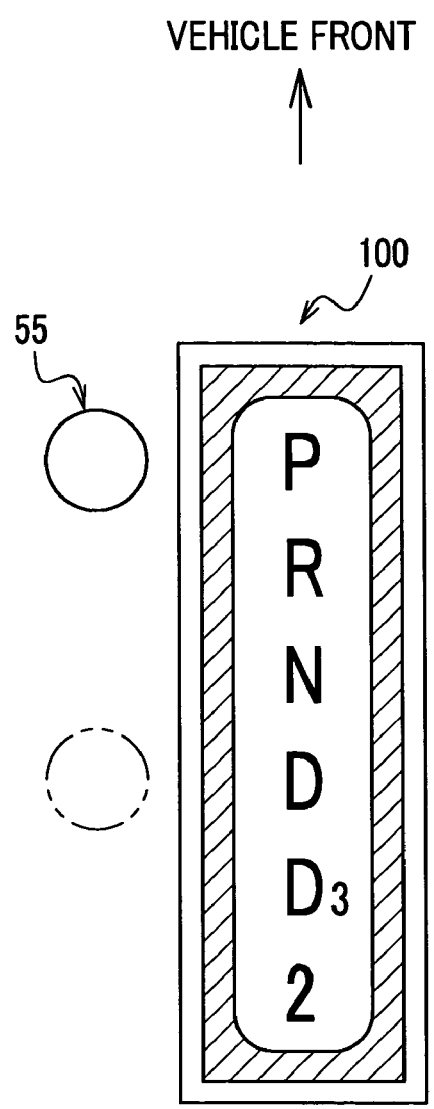
FIG. 7A and FIG. 7B are plan views showing patterns for automatic and manual modes, respectively.
Figure 7B:
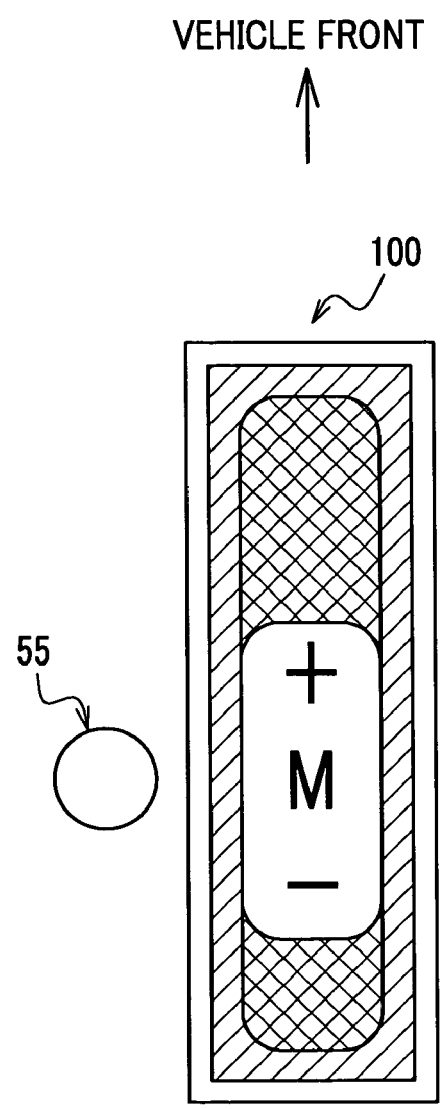

FIG. 7A and FIG. 7B are plan views showing patterns for automatic and manual modes, respectively. As shown in FIG. 7A, the pattern for automatic mode has automatic transmission positions in a line, P (parking), R (rear), N (neutral), D (drive), D3 (third) and 2 (second). As shown in FIG. 7B, the pattern for manual mode has a shift-up position "+", a neutral position (base position) M and a shift-down position "−".

Description is given to the ECU 68.

The ECU 68 has a computer (not shown), a drive circuit (not shown) and the like. The ECU 68 executes digitization and processing for a signal generated by the direction sensor 64, producing drive signals for the transmission actuator 69, the tactile force generator 66 and the monitor 100. The ECU 68 has a control panel setting module 4A, a tactile force control module 4B and a transmission control module 4C, as shown in FIG. 8 to be described later.

Description is given to the control panel setting module 4A.

Figure 8:
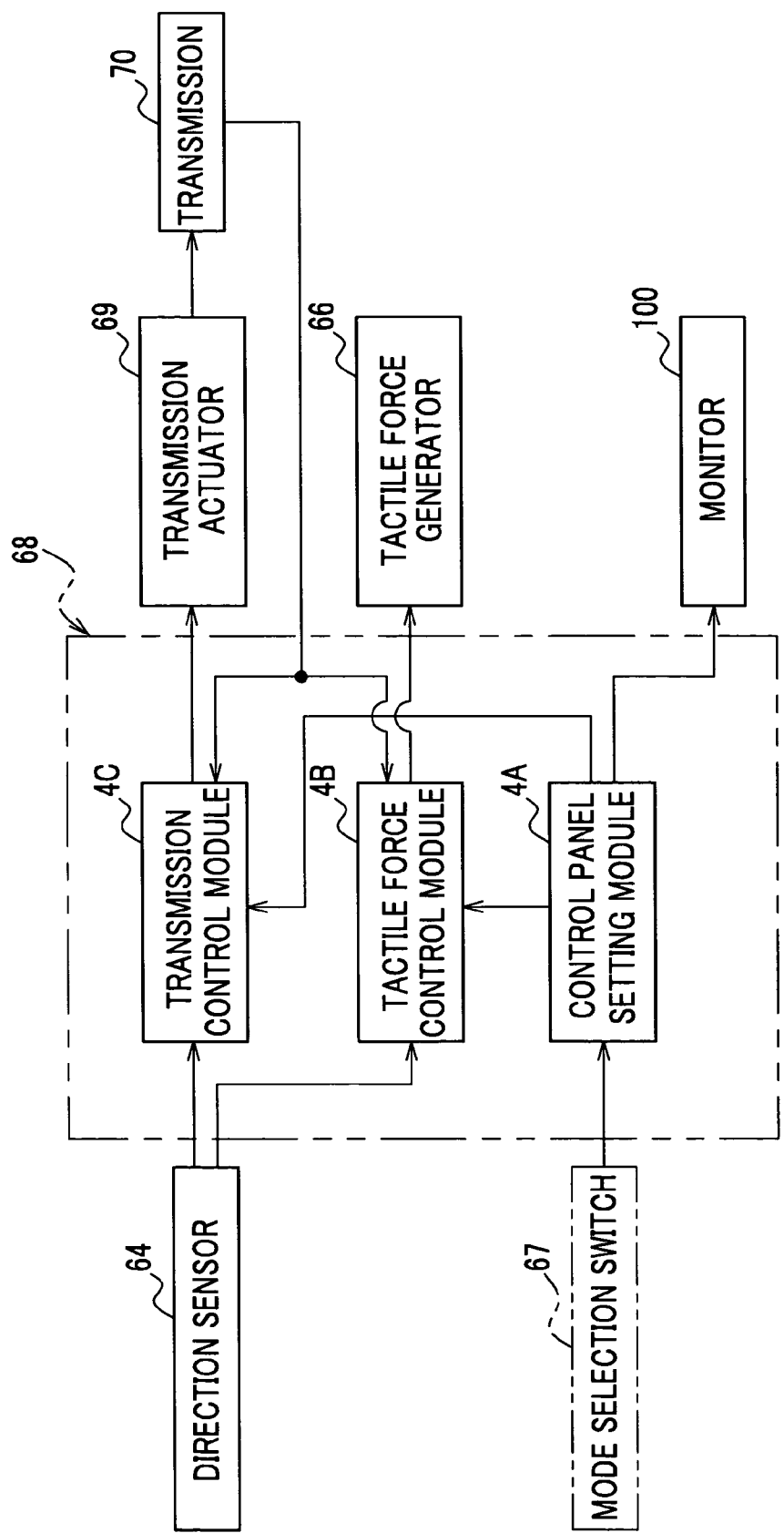
FIG. 8 is a block diagram depicting the structure of an apparatus for generating a tactile force according to the present invention.

FIG. 8 is a block diagram depicting the structure of an apparatus for generating tactile force according to the second embodiment of the present invention. As shown in FIG. 8, the control panel setting module 4A, which establishes the virtual control panel corresponding to the operational mode selected by the mode selection switch 67, generates and sends signals to the tactile force control module 4B, the transmission control module 4C and the monitor 100. The control panel setting module 4A establishes the pattern for automatic mode as an initial pattern so that it can be displayed on the monitor 100 at vehicular start up.

Description is given to the tactile force control module 4B.

The tactile force control module 4B determines a tactile force according to a position of the shift lever 55 on the control panel established by the control panel setting module 4A, and exerts the tactile force on the shift lever 55 via the tactile force generator 66. Specifically speaking, when a driver shifts the shift lever 55 one position to another while the control panel is set for automatic mode, for example P→R, R→N and the like, it is possible to provide the shift lever 55 with a detent force. The detent force is characterized 15 in that it acts on the shift lever 55 as a smaller force in a moving direction of the shift lever 55 before manipulation and guides the shift lever 55 to a next position. In this way, it is possible to give the driver the same feeling as that of a mechanical shift lever. In this connection, when the shift lever 55 is in one of positions R, N, D and D3, the tactile force generator 66 provides the shift lever 55 with a force so that it can be kept in the same position. On the other hand, when the shift lever 55 is one of positions P and 2, it may be possible that the shift lever 55 is kept in the same position by the tactile force generator 66 or by shift gates (not shown) at forward and backward ends, which are formed in the tilt support mechanism 65. Furthermore, a mechanism for locking the shift lever 55 during vehicular standstill is prepared in the forward end of the shift gate of the tilt support mechanism 65.

When a driver moves the shift lever 55 back and forth relative to the neutral position M in the manual mode, the tactile force control module 4B determines a tactile force, delivering a signal to the tactile force generator 66. The tactile force control module 4B also generates a signal indicative of a tactile force that gradually restores the shift lever 55 to the neutral position M, sending the signal to the tactile force generator 66.

Description is given to the transmission control module 4C.

The transmission control module 4C controls the transmission actuator 69 which adjusts the transmission 70 according to the position of the shift lever 55 on the control panel established by the control panel setting module 4A. Specifically speaking, when the shift lever 55 is, for example, in the position R while the control panel displays the automatic transmission pattern (see FIG. 7A), the direction sensor 64 detects a displacement of the shift lever 55 relative to the position P, delivering it to the transmission control module 4C. The transmission control module 4C recognizes that the position of the shift lever 55 is in the position R according to a signal indicative of the automatic transmission pattern sent by the control panel setting module 4A and a signal sent by the direction sensor 64. As a result of this processing, the transmission control module 4C generates a signal and sends it to the transmission actuator 69. The actuator 69 drives the transmission 70 so that it is configured for vehicular rear travel. When the shift lever 55 is in other positions such as P, N, D, D3 and 2, the transmission control module 4C controls the transmission actuator 69 according to signals sent by the direction sensor 64 and the control panel setting module 4A in the same manner as that of the position R.

When the control panel displays the manual transmission pattern (see FIG. 7B), detecting a forward displacement of the shift lever 55 relative to the position M, the direction sensor 64 delivers it to the transmission control module 4C when a driver forwardly tilts the shift lever 55 beyond the position M. The transmission control module 4C delivers a signal indicative of a shift-up by one position to the transmission actuator 69 according to a signal indicative of the manual transmission pattern sent by the control panel setting module 4A and another signal sent by the direction sensor 64. On the other hand, when the driver backwardly tilts the shift lever 55 beyond the position M, the transmission control module 4C delivers a signal indicative of a shift-down by one position to the transmission actuator 69, in contrast to the forward tilting. Furthermore, if tilting of the shift lever 55 does not bring any effect, which occurs when the driver forwardly or backwardly tilts the lever 55 while the highest or lowest gear has already been selected, a sensor (not shown) attached to the transmission 70 delivers a signal indicative of the status of highest or lowest gear position to the tactile force control module 4B and the transmission control module 4C. Receiving this signal, the tactile force control module 4B sends the tactile force generator 66 a signal indicative of greater tactile force acting on the shift lever 55 so as to restrict its ineffective movement. Also, the module 4B cuts off a signal which the transmission control module 4C delivers to the transmission actuator 69.

Operation of the apparatus 60 is now described with reference to FIGS. 7A and 7B.

When the engine of a vehicle is started up, the automatic transmission pattern as shown in FIG. 7A is displayed on the monitor 100, and the shift lever 55, which lies on the left side and at the forward end of the monitor 100, is in the position P of the automatic transmission pattern. The direction sensor 64 detects the position of the shift lever 55 and delivers a signal indicative of the position to the transmission control module 4C and the tactile force control module 4B, which both belong to the ECU 68 (see FIGS. 6 and 8). The transmission control module 4C generates a signal indicative of the position P to the transmission actuator 69 according to signals sent by the direction sensor 64 and the control panel setting module 4A. The tactile force control module 4B determines a detent force that is imposed on the shift lever 55 while it is moving from one shift position to the next, according to the position P of the shift lever 55, delivering a signal indicative of the detent force to the tactile force generator 66. When the shift lever 55 is in other positions, the tactile force control module 4B and the transmission control module 4C execute the same operation as that described above for the case of the position P.

Figure 9:
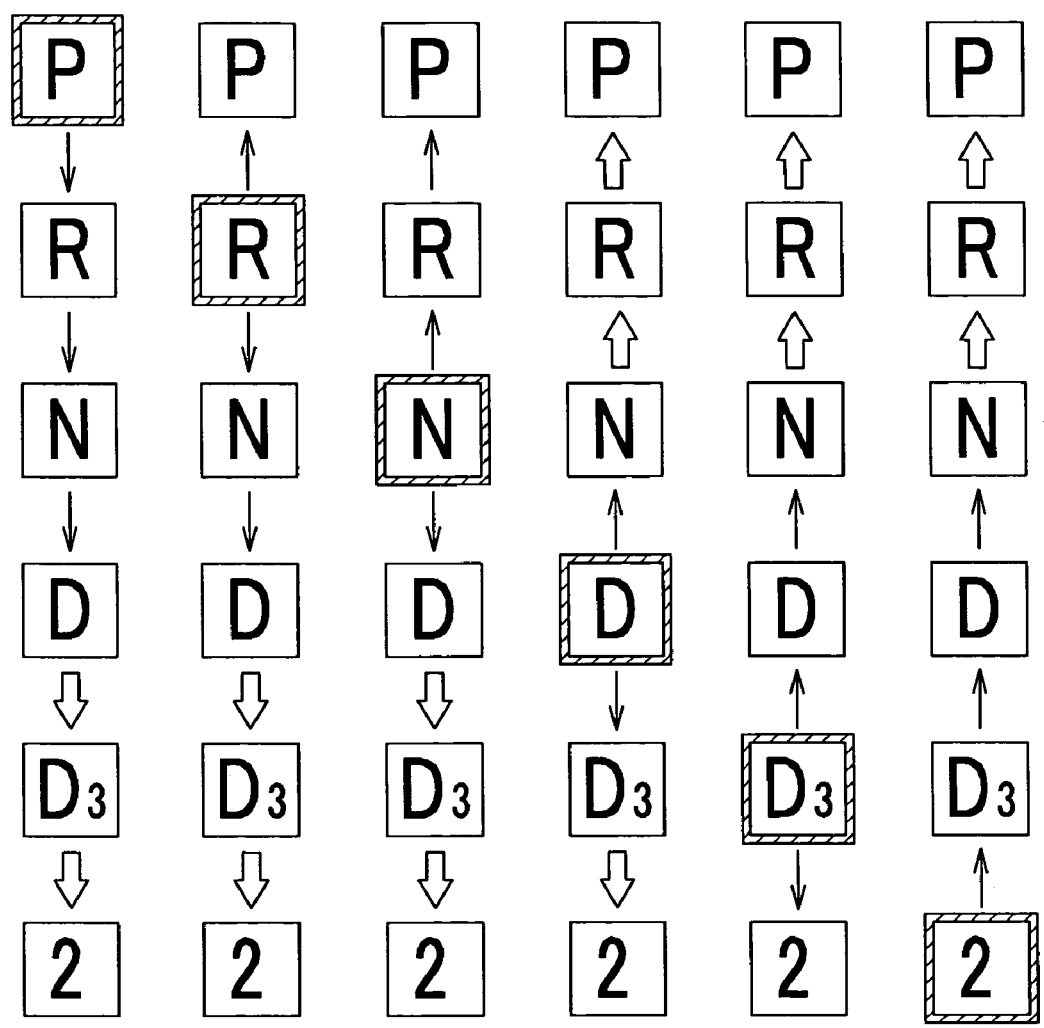
FIG. 9 is a plan view illustrating a detent force for each of the positions of a shift lever in automatic transmission pattern as shown in FIG. 7A.
Figure 10:
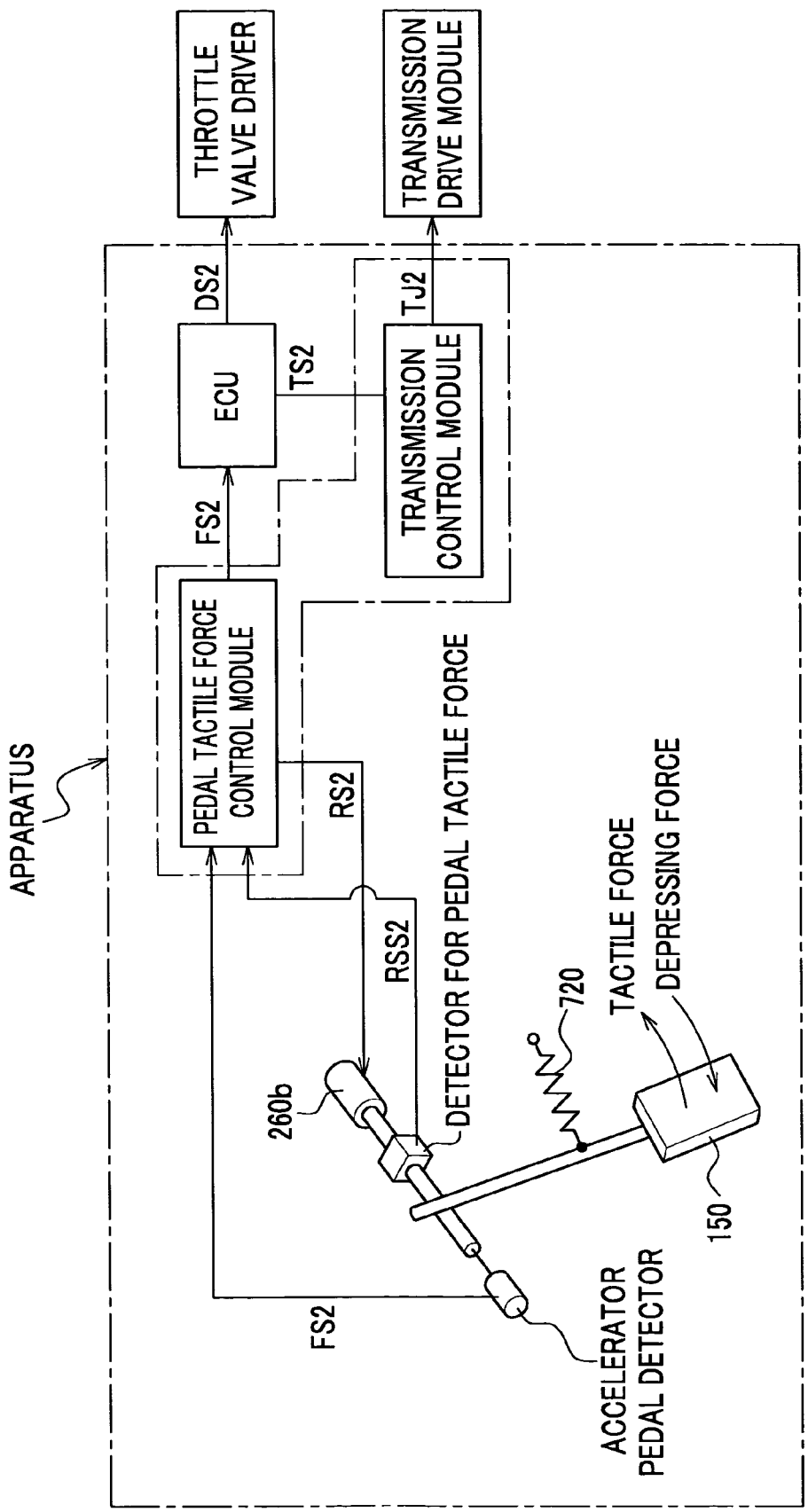
FIG. 10 is a block diagram showing the structure of a conventional apparatus for generating tactile force.
Figure 11:
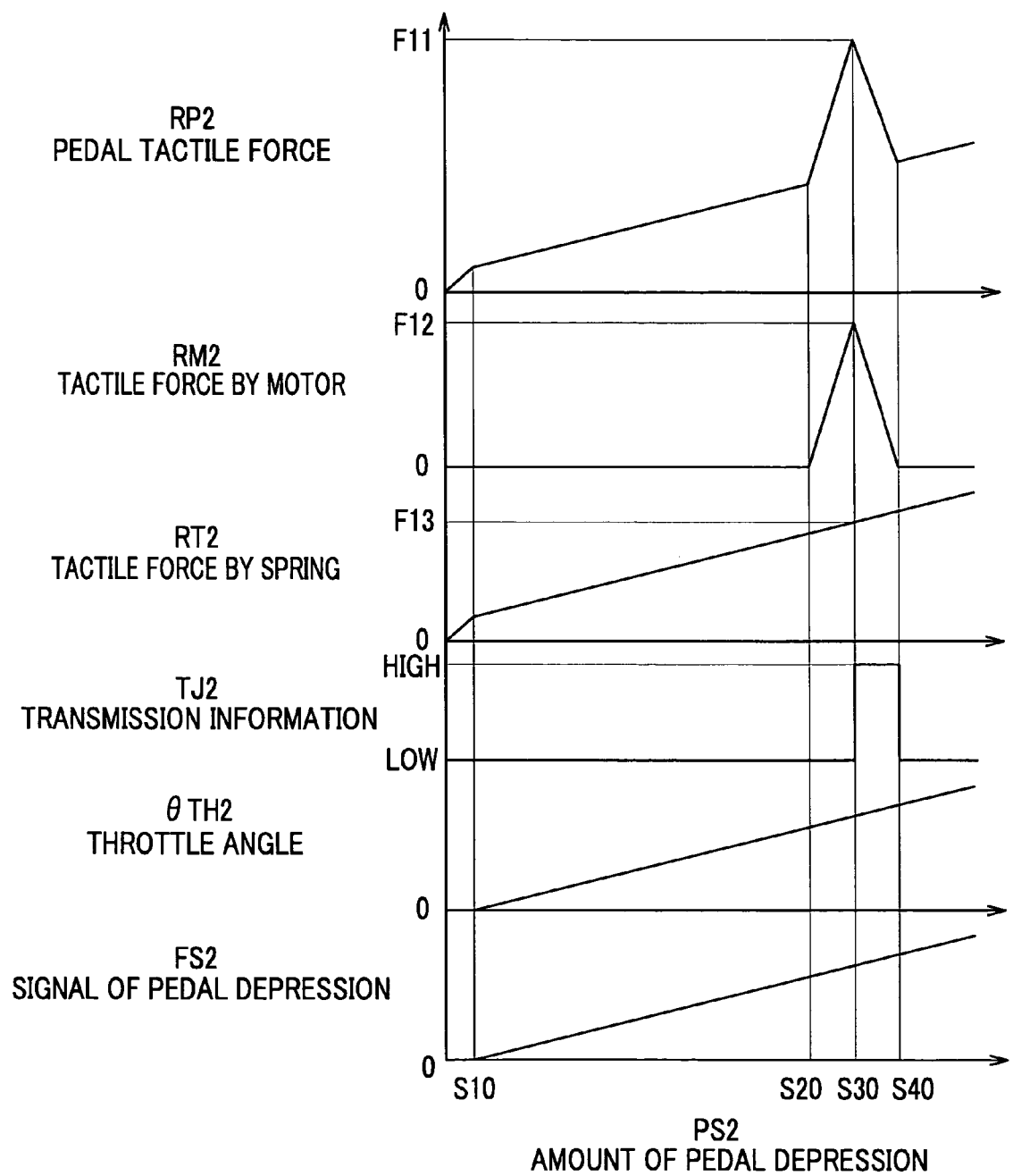
FIG. 11 is a graph depicting operation of a conventional apparatus.
Figure 12:
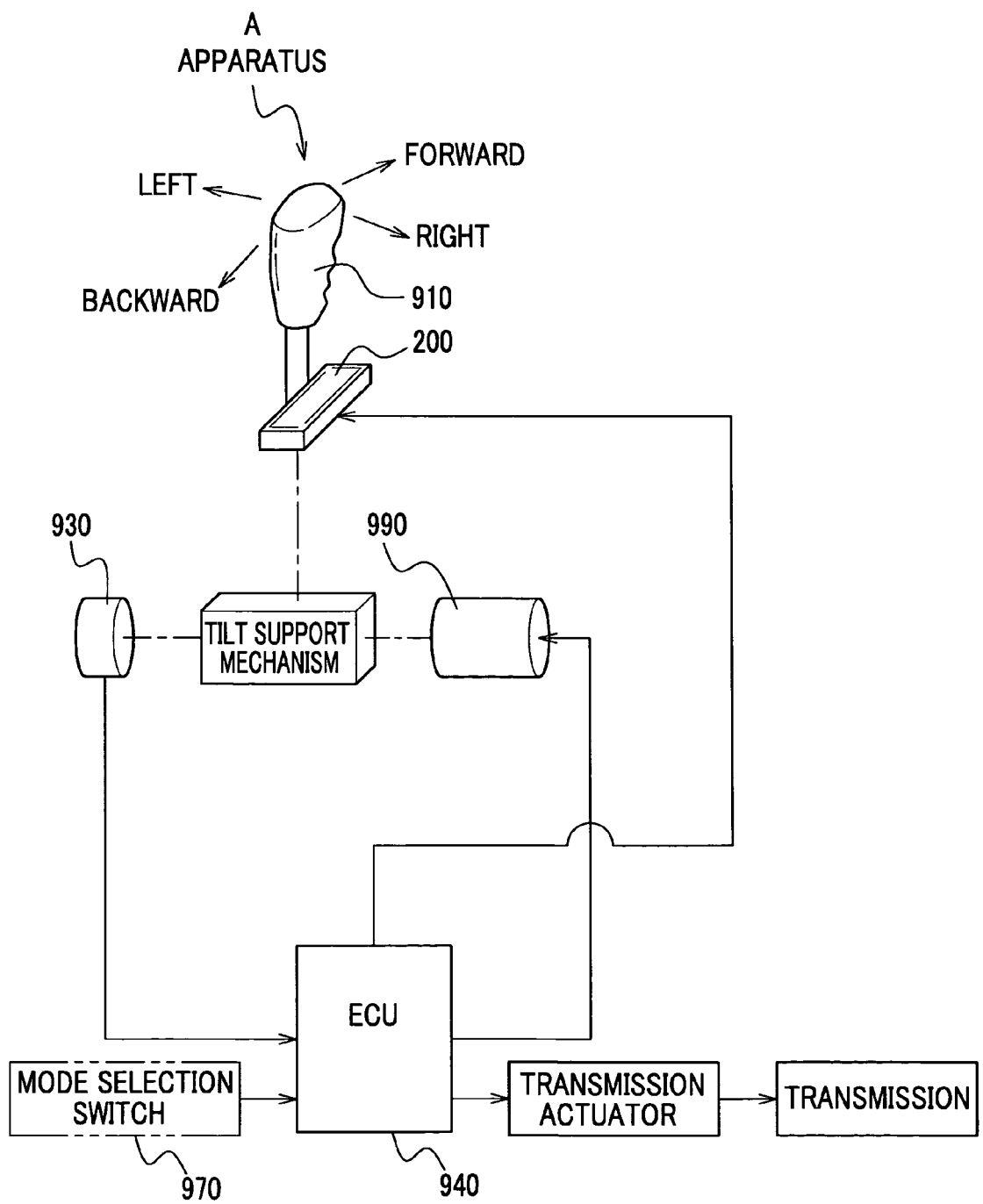
FIG. 12 is a block diagram showing the structure of a conventional apparatus.
Figure 14:
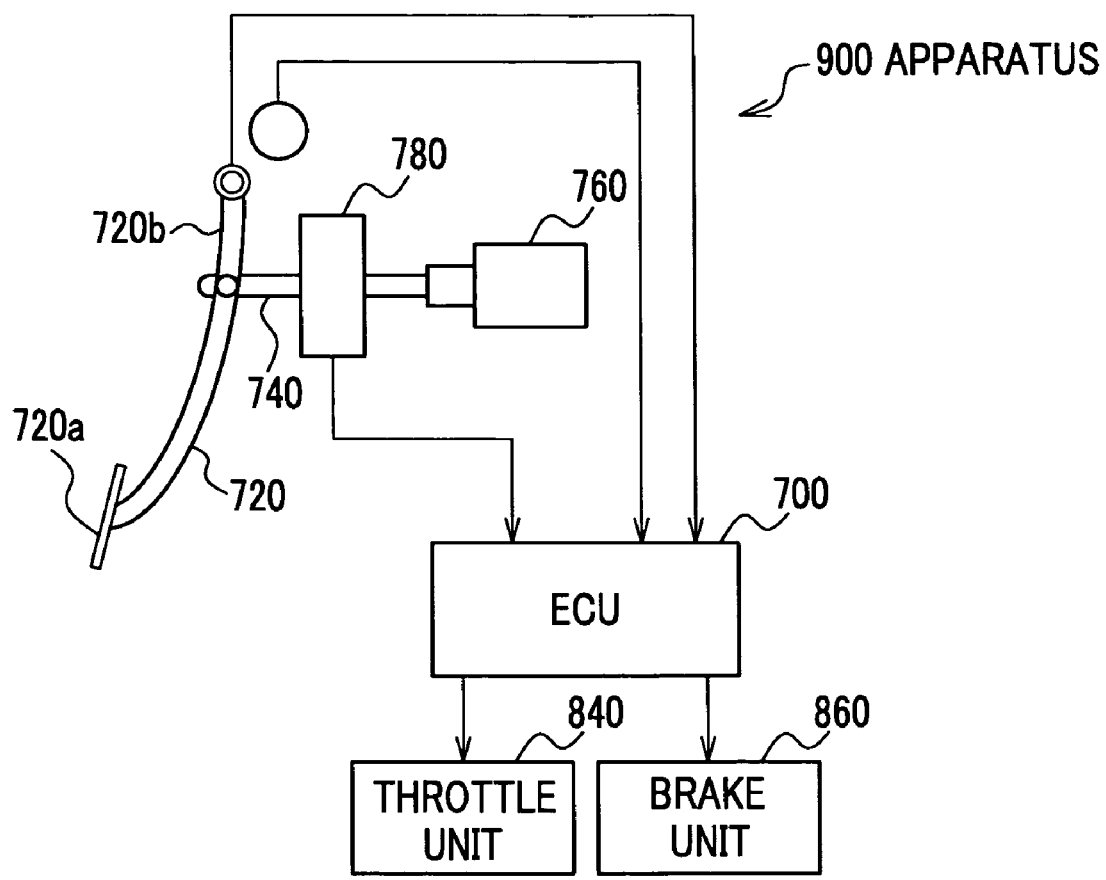
FIG. 14 is a block diagram illustrating a conventional apparatus.

As shown in FIG. 9, detent forces are respectively determined by the tactile force control module 4B according to the positions of the shift lever 55 and vehicle speed. A shift position enclosed by diagonal lines in FIG. 9 represents a position of the shift lever 55. A fine arrow represents a normal detent force and a bold arrow represents a detent force which is greater than the normal one. FIG. 9 illustrates a detent force for each of the positions of the shift lever 55 when the shift lever 55 is sequentially moved from P to 2, as shown left to right on the figure. Hereinafter description is given to the operation in relation to the position of the shift lever 55 left to right as shown in FIG. 9.

As shown in FIG. 9, when the shift lever 55 is in the position P, the tactile force control module 4B determines a greater tactile force for the positions D3 and 2 which lie four or more positions apart from the position P, compared with a nominal tactile force for the positions R, N and D. When the shift lever 55 is in the position R, the tactile force control module 4B determines a greater tactile force for the positions D3 and 2 which lie three or more positions apart from the position R. When the shift lever 55 is in the position N, the tactile force control module 4B determines a greater tactile force for the positions D3 and 2 which backwardly lie two or more positions apart from the position N.

When the shift lever 55 is in the position D and the speed of a vehicle is not less than a certain speed, the tactile force control module 4B determines a greater tactile force for the positions P, R and 2 which lie two or more positions apart from the position D, compared with the normal tactile force. When the shift lever 55 is in the position D3 and the speed of the vehicle is not less than a certain speed, the tactile force control module 4B determines a greater tactile force for the positions P and R which lie three or more positions apart from the position D3. When the shift lever is in the position 2 and the speed of the vehicle is not less than a certain speed, the tactile force control module 4B determines a greater tactile force for the positions P and R which lie four or more positions apart from the position 2. In this connection, the greater tactile force than the normal one may be determined so that it can make a driver alert so as to prevent him from erroneous manipulation. Therefore, it may be possible to determine a tactile force so that a driver can select a position where the greater tactile force is imposed if a driver intentionally applies a greater force to the shift lever 55.

As shown in FIG. 7A, when a driver selects a mode by the mode selection switch 67 while the shift lever 55 is in the position D of the automatic transmission pattern, the mode selection switch 67 sends a signal indicative of the position to the control panel setting module 4A of the ECU 68. The control panel setting module 4A switches the control panel from the automatic transmission pattern to the manual transmission pattern according to the signal delivered by the mode selection switch 67 and delivers a signal indicative of the pattern to the tactile force control module 4B, the transmission control module 4C and the monitor 100. In this way, the manual transmission pattern is displayed on the monitor 100, so that the shift lever 55 is adapted to be in the position M of the manual transmission pattern.

When the driver forwardly tilts the shift lever 55 to a certain position against a tactile force determined by the tactile force control module 4B, the direction sensor 64 detects the position of the shift lever 55 having reached the certain point and delivers a signal indicative of the position to the transmission actuator 69 via the transmission control module 4C. The transmission actuator 69 shifts up the transmission 70 by one-speed according to the signal delivered by the transmission control module 4C, thereby making the vehicle able to accelerate. If forward tilting of the shift lever 55 does not bring any effect in terms of shift-up, the tactile force control module 4B and the tactile force generator 66 restrict forward movement of the shift lever 55.

On the other hand, when the driver backwardly tilts the shift lever 55 to a certain position against a tactile force, the direction sensor 64 detects the position of the shift lever 55 having reached the certain point and delivers a signal indicative of the position to the transmission actuator 69 via the transmission control module 4C. The transmission actuator shifts down the transmission 70 by one-speed according to the signal delivered by the transmission control module 4C, thereby making the vehicle decelerate. If backward tilting of the shift lever 55 does not bring any effect in terms of shift-down, the tactile force control module 4B and the tactile force generator 66 restricts backward movement of the shift lever 55.

The apparatus according to the present invention brings the following advantages.

It is possible to change the shift pattern and position of the shift lever 55 so as to provide a driver with better manipulation because the modes such as the automatic and manual modes are established on the monitor 100 as a control panel, and the apparatus 60 controls the transmission 70 according to the positions of the shift lever 55 on the control panel.

It is possible for the driver to visually check the position of the shift lever 55 and the control panel because the control panel is displayed on the monitor 100 which is disposed near the bottom end of the shift lever 55.

It is possible to reduce a space required of the monitor 100 in a right-left direction compared with that of a conventional and mechanical apparatus, because the monitor 100 is not required to simultaneously display both automatic and manual transmission patterns.

It is possible to protect against an inadvertent excess of manipulation for the shift lever 55 because the tactile force control module 4B determines a greater force for the position R which lies two positions apart from the position D when the shift lever 55 is in the position D of the automatic transmission pattern. This will eliminate the necessity for adding a lock mechanism in order to prevent excessive shifting, thereby achieving a cost reduction. The advantage is attributed to the fact that the ECU 68 is able to prepare a configuration aiming at the protection described above without the lock mechanism.

It is possible to make a driver know that the transmission is in either the highest or lowest position because when forward or backward tilting of the shift lever 55 does not bring any shift-up or shift-down effect, the tactile force control module 4B and the tactile force generator 66 restrict forward or backward movement of the shift lever 55. The apparatus according to the present invention can provide the driver with a tactile force which virtually makes him feel driving a vehicle that is equipped with a physically controlled mechanism.

In this connection, it is possible to determine an optimal tactile force, which is produced by a combination of two kinds of tactile force, one generated by the motor and the other one by the electromagnetic brake, except for a tactile force generated by the tension coil spring. This results in increase in the operability of the shift lever 55.

The apparatus for generating tactile force according to the present invention is able to employ a combination of a spring, an electromagnetic brake and a motor. These elements have their own features briefly described below. The spring can provide a force without electrical energy. The electromagnetic brake cannot produce a productive force in terms of movement but a braking force with a small amount of electricity. The motor, which is able to produce both types of force, requires a relatively large amount of electricity. The apparatus according to the present invention is able to take advantage of the features described above. For example, it is possible to use the spring in order to provide a force which is constant and acts in a fixed direction, the electromagnetic brake in order to produce a force to give a virtual resistive force, and the motor in order to produce a force other than those given by the spring and electromagnetic brake. In this way, the apparatus is able to control a tactile force and feeling in terms of manipulation, taking advantage of the features intrinsic to the elements.

While the invention has been described in detail and with reference to specific embodiments thereof, it will be apparent to one skilled in the art that various changes and modifications can be made therein without departing from the spirit and scope thereof. For example, although the unit 35 for pedal tactile force and transmission control is separate from the ECU 16, it may alternatively possible to integrally dispose the unit 35 within the ECU 16.

Foreign priority document, JP2003-165577 filed on Jun. 10, 2003, is hereby incorporated by reference.

What is claimed is:

1. An apparatus for generating tactile force for a vehicle comprising:
   a motor for generating the tactile force;
   a spring for generating the tactile force;
   an electromagnetic brake for cooperatively generating the tactile force with at least one of the motor and the spring;
   an accelerator pedal; and
   a shift lever,
   wherein the apparatus generates the tactile force for at least one of the accelerator pedal and the shift lever with a drive-by-wire method.

2. An apparatus according to claim 1, further comprising:
   a detector for detecting an amount of depression of the accelerator pedal;
   a throttle control unit for controlling a throttle angle according to a signal indicative of the amount of depression detected by the detector; and
   a pedal tactile force generator for providing the accelerator pedal with the tactile force according to the signal,
   wherein the apparatus controls the tactile force according to the signal, and at least one of the motor and the electromagnetic brake is adapted to have a hysteresis of the tactile force so that the accelerator pedal can be restored more lightly than when the pedal is depressed.

3. An apparatus according to claim 2, wherein the apparatus further comprises a unit for pedal tactile force and transmission control which not only controls the pedal tactile force generator so that the tactile force takes a local maximum when the accelerator pedal is depressed by a predetermined amount, but also sends a signal indicative of speed change to an automatic transmission of the vehicle so as to control the transmission.

4. An apparatus according to claim 3,
   wherein while the shift lever is in an automatic mode, the unit for pedal tactile force and transmission control controls the pedal tactile force generator so that the tactile force takes the local maximum when the accelerator pedal is depressed by the predetermined amount, and
   wherein while the shift lever is in a manual mode, the unit controls the generator so as not to generate the local maximum.

5. An apparatus according to claim 2, wherein while the vehicle is traveling at a constant speed in a cruise control mode, the apparatus controls the pedal tactile force generator so as to hold the accelerator pedal at a position in accordance with a throttle angle correlated with the constant speed.

6. An apparatus according to claim 2, wherein while the vehicle is traveling at a constant speed in a cruise control mode, the apparatus controls the pedal tactile force generator in a process comprising:
   restoring the accelerator pedal to a stroke start point thereof;
   providing the accelerator pedal with a smaller tactile force until the accelerator pedal reaches a position in accordance with a throttle angle; and
   not only canceling constant-speed traveling but also increasing a tactile force for the accelerator pedal if the throttle pedal is depressed beyond the position.

7. The apparatus according to claim 1 further comprising:
   a position detector for detecting a position of the shift lever;
   a mode selection switch for selecting a mode for the shift lever from a plurality of modes;
   a set-up unit for establishing a virtual control panel, whose configuration is representative of the mode selected by the mode selection switch;
   a shift lever tactile force generator for generating the tactile force for the shift lever according to the position of the shift lever in accordance with the configuration of the virtual control panel; and
   a transmission control module for controlling a transmission of the vehicle according to the position of the shift lever.

8. An apparatus according to claim 7, wherein the apparatus has a display near a bottom potion of the shift lever for visualizing the virtual control panel which is established by the set-up unit.

9. An apparatus according to claim 7, wherein the plurality of modes comprises a first mode and a second mode,
   wherein the first mode is an automatic mode in which the position of the shift lever is selectable from a plurality of automatic positions by manipulating the shift lever, and
   wherein the second mode is a manual mode in which the transmission of the vehicle can be shifted by tilting the shift lever back and forth.

10. An apparatus according to claim 9, wherein the shift lever is able to serve as the mode selection switch when a driver of the vehicle exerts a force sideways on the shift lever.

11. An apparatus according to claim 9, further comprising:
    a detent force control unit for controlling a detent force acting on the shift lever while the shift lever is moving from one automatic position to another,
    wherein when a driver of the vehicle happens to shift the shift lever by not less than two positions relative to a current position thereof, the detent force control unit produces a greater tactile force for the shift lever so that inadvertent excess of shifting by the driver can be prevented.

12. An apparatus according to claim 9, wherein when one of shifting up and shifting down by the shift lever is not effective, the shift lever tactile force generator produces a greater tactile force for the shift lever so as to notify a driver of the vehicle of ineffectiveness.

13. An apparatus according to claim 11, wherein the detent force control unit produces a greater tactile force for the shift lever in a particular direction according to vehicular traveling conditions and positions of the shift lever, even if the shift lever is manipulated against the greater tactile force, the transmission control module keeps sending a signal which is generated based on a position of the shift lever before manipulation thereof, and when a force exerted by the driver on the shift lever is decreased, the detent force control unit controls the detent force so that the shift lever slowly returns.

* * * * *